United States Patent
Huang et al.

(10) Patent No.: US 12,095,534 B2
(45) Date of Patent: Sep. 17, 2024

(54) CSI REPORT RELATED TO UL TRANSMISSION BANDWIDTH BY FULL DUPLEX CAPABLE UE

(71) Applicant: Qualcomm Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 17/617,541

(22) PCT Filed: Jun. 13, 2020

(86) PCT No.: PCT/CN2020/095997
§ 371 (c)(1),
(2) Date: Dec. 8, 2021

(87) PCT Pub. No.: WO2020/249119
PCT Pub. Date: Dec. 17, 2020

(65) Prior Publication Data
US 2022/0247468 A1   Aug. 4, 2022

(30) Foreign Application Priority Data

Jun. 14, 2019   (WO) ............... PCT/CN2019/091244

(51) Int. Cl.
*H04B 7/06* (2006.01)
*H04L 5/14* (2006.01)
(Continued)

(52) U.S. Cl.
CPC ............. *H04B 7/0626* (2013.01); *H04L 5/14* (2013.01); *H04W 24/08* (2013.01); *H04W 72/23* (2023.01)

(58) Field of Classification Search
CPC ... H04B 7/0626; H04L 5/0057; H04L 5/0094; H04L 5/14; H04W 24/08; H04W 24/10; H04W 72/23
See application file for complete search history.

(56) References Cited

U.S. PATENT DOCUMENTS

| 2015/0244444 A1 | 8/2015 | Mazzarese et al. |
| 2017/0054544 A1 | 2/2017 | Kazmi et al. |
(Continued)

FOREIGN PATENT DOCUMENTS

| CN | 106165518 A | 11/2016 |
| CN | 108933648 A | 12/2018 |
(Continued)

OTHER PUBLICATIONS

Liu D., et al., "On the Analog Self-Interference Cancellation for Full-Duplex Communications with Imperfect Channel State Information", IEEE Access, vol. 5, Jun. 28, 2017 (Jun. 28, 2017), pp. 9277-9290, XP011653563, DOI: 10.1109/ACCESS.2017.2702713, abstract.
(Continued)

*Primary Examiner* — Pao Sinkantarakorn
(74) *Attorney, Agent, or Firm* — QUALCOMM Incorporated

(57) ABSTRACT

Methods, systems, and devices for wireless communications are described. A full duplex user equipment (UE) may provide a channel state information (CSI) report to abase station to enable the base station to schedule simultaneous uplink and downlink communications for the full duplex UE. For example, the base station may transmit a CSI report configuration to the UE that indicates for the UE to report a full duplex CSI. In some cases, the CSI report configuration may include the UE to report CSI under a full duplex mode with or without an indication of an uplink bandwidth. Accordingly, the UE may calculate and report the self-full (Continued)

duplex mode CSI to the base station according to the received configuration. The base station may then determine a radio resource allocation and transport format for downlink data transfer and for uplink data transfer under the full duplex mode.

32 Claims, 18 Drawing Sheets

(51) Int. Cl.
  *H04W 24/08* (2009.01)
  *H04W 72/23* (2023.01)

(56) References Cited

U.S. PATENT DOCUMENTS

| | | | | |
|---|---|---|---|---|
| 2018/0097607 A1* | 4/2018 | Ji | ........................... | H04W 72/23 |
| 2020/0280357 A1* | 9/2020 | Bae | ....................... | H04W 24/10 |
| 2021/0281386 A1* | 9/2021 | Xia | ........................... | H04L 5/14 |
| 2022/0159580 A1* | 5/2022 | Su | ....................... | H04W 52/367 |

FOREIGN PATENT DOCUMENTS

| | | |
|---|---|---|
| EP | 2421178 A2 | 2/2012 |
| WO | WO-2013163900 A1 | 11/2013 |
| WO | WO-2019094781 A2 | 5/2019 |

OTHER PUBLICATIONS

Supplementary European Search Report—EP20823456—Search Authority—The Hague—Jun. 5, 2023.
Intel Corporation: "Remaining Issues on CSI Reporting", 3GPP TSG RAN WGI #92, R1-1802395, May 3, 2018 (May 3, 2018), pp. 1-7, Section 2.
International Search Report and Written Opinion—PCT/CN2019/091244—ISA/EPO—Mar. 12, 2020.
International Search Report and Written Opinion—PCT/CN2020/095997—ISA/EPO—Aug. 27, 2020.
Panasonic: "Discussion on CSI Measurement for Duplex Flexibility in NR", 3GPP TSG RAN WG1 Meeting #88bis, R1-1705133, Apr. 3-7, 2017 (Jul. 4, 2017), pp. 1-2, Section 1.
Qualcomm Incorporated: "CSI Reporting for sTTI", 3GPP TSG RAN WG1 #90b, 3GPP Draft; R1-1718108 CSI Reporting for STTI, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017 (Oct. 8, 2017), pp. 1-5, XP051341290, Retrieved from the Internet: URL: http://www.3gpp.org/ftp/Meetings_3GPP_SYNC/RAN1/Docs/ [retrieved on Oct. 8, 2017] the whole document.

* cited by examiner

CSI REPORT RELATED TO UL TRANSMISSION BANDWIDTH BY FULL DUPLEX CAPABLE UE

CROSS REFERENCE TO RELATED APPLICATIONS

The present application is a 371 national stage filing of International PCT Application No. PCT/CN2020/095997 by HUANG et al., entitled "CSI REPORT RELATED TO UL TRANSMISSION BANDWIDTH BY FULL DUPLEX CAPABLE UE," filed Jun. 13, 2020; and claims priority to PCT Application No. PCT/CN2019/091244 by HUANG et al., entitled "CSI REPORT RELATED TO UL TRANSMISSION BANDWIDTH BY FULL DUPLEX CAPABLE UE," filed Jun. 14, 2019, each of which is assigned to the assignee hereof, and each of which is expressly incorporated by reference in its entirety herein.

BACKGROUND

The following relates generally to wireless communications, and more specifically to channel state information (CSI) report related to uplink (UL) transmission bandwidth by a full duplex-capable user equipment (UE).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UEs.

In some wireless communication systems, a UE may be capable of both transmitting uplink traffic to a base station and receiving downlink traffic from a base station (e.g., a same or different base station, different antennas from a same or different base station, etc.) simultaneously. This capability of communicating in two directions at a same time and on a same frequency may be defined as a full duplex capability of the UE. However, the full duplex capability may result in a self-interference at the UE, which can impact the downlink and/or uplink traffic. Efficient techniques are desired for addressing and mitigating this self-interference.

SUMMARY

The described techniques relate to improved methods, systems, devices, and apparatuses that support a channel state information (CSI) report related to uplink transmission bandwidth by a full duplex-capable user equipment (UE). Generally, the described techniques provide for a full duplex UE to receive a CSI reporting configuration from a base station, monitor for CSI reference signals (CSI-RSs) based on the CSI reporting configuration, and transmit a full duplex CSI report based on the monitoring, where the full duplex CSI report includes, at least in part, uplink bandwidth information. For example, the full duplex CSI report may include CSI for a set of possible uplink bandwidths (e.g., and related information about the possible uplink bandwidths, such as indications of the uplink bandwidths, pathloss, transmission power, self-interference strength, etc.), where the set of possible bandwidths are determined by the UE and/or are a list of bandwidths signaled by the base station. Additionally or alternatively, the base station may indicate an uplink bandwidth for the UE to monitor and measure the CSI, and the UE may transmit the full duplex CSI report for the indicated uplink bandwidth.

In some cases, the UE may calculate the full duplex CSI based on information received from the base station and/or based on measurements made by the UE. For example, the base station may indicate an uplink transmission power, a multi-antenna scheme, a CSI-RS repetition scheme, or a combination thereof, for the UE to use when measuring a downlink channel status for the full duplex CSI report. Additionally or alternatively, the UE may calculate the full duplex CSI from measurements based on a number of transmit antennas and a number of receive antennas of the UE, with a certain uplink transmission at resource elements of CSI-RSs, or a combination thereof. As noted above, when transmitting the full duplex CSI report for the set of possible uplink bandwidths, the UE may include related information about the possible uplink bandwidths. Accordingly, based on this related information, the base station may estimate a CSI for any of the possible uplink bandwidths for the UE. Subsequently, based on the estimated CSI or reported CSI from the UE (e.g., if the base station indicates the uplink bandwidth for the UE to report the CSI), the base station may then schedule simultaneous uplink and downlink traffic with the UE.

A method of wireless communications by a UE is described. The method may include, receiving a CSI reporting configuration for full duplex CSI reporting, monitoring for a CSI-RS based on the CSI reporting configuration, and transmitting a full duplex CSI report that includes uplink bandwidth information based on the monitoring.

An apparatus for wireless communications by a UE is described. The apparatus may include a processor, memory coupled with the processor, and instructions stored in the memory. The instructions may be executable by the processor to cause the apparatus to receive a CSI reporting configuration for full duplex CSI reporting, monitor for a CSI-RS based on the CSI reporting configuration, and transmit a full duplex CSI report that includes uplink bandwidth information based on the monitoring.

Another apparatus for wireless communications by a UE is described. The apparatus may include means for receiving a CSI reporting configuration for full duplex CSI reporting, monitoring for a CSI-RS based on the CSI reporting configuration, and transmitting a full duplex CSI report that includes uplink bandwidth information based on the monitoring.

A non-transitory computer-readable medium storing code for wireless communications by a UE is described. The code may include instructions executable by a processor to receive a CSI reporting configuration for full duplex CSI reporting, monitor for a CSI-RS based on the CSI reporting configuration, and transmit a full duplex CSI report that includes uplink bandwidth information based on the monitoring.

In some examples of the method, apparatuses, and non-transitory computer-readable medium described herein, transmitting the full duplex CSI report may include operations, features, means, or instructions for transmitting a full duplex CSI report that includes the uplink bandwidth information that indicates CSI for a set of different uplink bandwidths.

In some examples of the method, apparatuses, and non-transitory computer-readable medium described herein, receiving the CSI reporting configuration may include operations, features, means, or instructions for receiving the CSI reporting configuration that indicates an uplink bandwidth, where the uplink bandwidth information indicates CSI for the uplink bandwidth.

Some examples of the method, apparatuses, and non-transitory computer-readable medium described herein may further include operations, features, means, or instructions for receiving an uplink grant and a downlink grant based on the full duplex CSI report, and simultaneously transmitting an uplink data transmission based on the uplink grant and receiving a downlink data transmission based on the downlink grant.

In some examples of the method, apparatuses, and non-transitory computer-readable medium described herein, receiving the CSI reporting configuration may include operations, features, means, or instructions for receiving the CSI reporting configuration that indicates an uplink transmission power when measuring a downlink channel status, where the full duplex CSI report indicates full duplex CSI determined based on the uplink transmission power.

In some examples of the method, apparatuses, and non-transitory computer-readable medium described herein, receiving the CSI reporting configuration may include operations, features, means, or instructions for receiving the CSI reporting configuration that indicates an uplink multi-antenna scheme when measuring a downlink channel status, where the full duplex CSI report indicates full duplex CSI determined based on the uplink multi-antenna scheme.

In some examples of the method, apparatuses, and non-transitory computer-readable medium described herein, receiving the CSI reporting configuration may include operations, features, means, or instructions for receiving the CSI reporting configuration that indicates a CSI-RS repetition scheme, where the full duplex CSI report indicates full duplex CSI determined based on the CSI-RS repetition scheme.

Some examples of the method, apparatuses, and non-transitory computer-readable medium described herein may further include operations, features, means, or instructions for calculating full duplex CSI based on the CSI reporting configuration and the monitoring, where the full duplex CSI report indicates the calculated full duplex CSI.

Some examples of the method, apparatuses, and non-transitory computer-readable medium described herein may further include operations, features, means, or instructions for measuring a downlink channel status based on a first number of transmit antennas and a second number of receive antennas of the UE, determining a self-interference metric using the first number of transmit antennas and the second number of receive antennas, and calculating full duplex CSI based on the downlink channel status and the self-interference metric, where the full duplex CSI report indicates the calculated full duplex CSI.

Some examples of the method, apparatuses, and non-transitory computer-readable medium described herein may further include operations, features, means, or instructions for measuring a downlink channel status for an uplink transmission at one or more resource elements on the CSI-RS, and calculating full duplex CSI based on the downlink channel status and a transmission type of the uplink transmission, where the full duplex CSI report indicates the calculated full duplex CSI.

In some examples of the method, apparatuses, and non-transitory computer-readable medium described herein, receiving the CSI reporting configuration may include operations, features, means, or instructions for receiving the CSI reporting configuration that indicates the uplink transmission type utilizes a first uplink transmission power of a set of different uplink transmission powers, a first uplink multiple antenna scheme of a set of different multiple antenna schemes, or both.

In some examples of the method, apparatuses, and non-transitory computer-readable medium described herein, transmitting the full duplex CSI report may include operations, features, means, or instructions for transmitting the full duplex CSI report that indicates a set of CSIs, each CSI of the set of CSIs corresponding to a respective uplink bandwidth value from a list of bandwidth values.

In some examples of the method, apparatuses, and non-transitory computer-readable medium described herein, the list of bandwidth values may be a list of numbers of physical resource blocks (PRBs), subbands, or both.

In some examples of the method, apparatuses, and non-transitory computer-readable medium described herein, transmitting the full duplex CSI report may include operations, features, means, or instructions for transmitting the full duplex CSI report that indicates that a respective CSI of the set of CSIs corresponds to a respective uplink bandwidth value from a list of bandwidth values.

In some examples of the method, apparatuses, and non-transitory computer-readable medium described herein, the full duplex CSI report includes a number of CSIs that may be fewer than a number of uplink bandwidth value in the list of bandwidth values.

Some examples of the method, apparatuses, and non-transitory computer-readable medium described herein may further include operations, features, means, or instructions for selecting a subset of uplink bandwidth values from the list of bandwidth values on which to report CSI based on a priority order.

In some examples of the method, apparatuses, and non-transitory computer-readable medium described herein, transmitting the full duplex CSI report may include operations, features, means, or instructions for transmitting the full duplex CSI report that indicates a single CSI and a single uplink bandwidth threshold.

In some examples of the method, apparatuses, and non-transitory computer-readable medium described herein, the single CSI may be valid when uplink bandwidth does not exceed the uplink bandwidth threshold.

In some examples of the method, apparatuses, and non-transitory computer-readable medium described herein, transmitting the full duplex CSI report may include operations, features, means, or instructions for transmitting the full duplex CSI report that indicates the uplink bandwidth information that reports one or more of an uplink pathloss metric, an uplink power headroom metric, a self-interference cancellation ratio, or any combination thereof.

In some examples of the method, apparatuses, and non-transitory computer-readable medium described herein, transmitting the full duplex CSI report may include operations, features, means, or instructions for transmitting the full duplex CSI report that indicates the uplink bandwidth information that reports a self-interference cancellation ratio, a non-full duplex CSI, and one of an uplink pathloss metric or an uplink power headroom metric.

In some examples of the method, apparatuses, and non-transitory computer-readable medium described herein, transmitting the full duplex CSI report may include operations, features, means, or instructions for transmitting the full duplex CSI report that indicates the uplink bandwidth information that reports a power of self-interference metric, an uplink bandwidth threshold, and a non-full duplex CSI.

In some examples of the method, apparatuses, and non-transitory computer-readable medium described herein, the power of self-interference metric may be as reported when uplink bandwidth does not exceed the uplink bandwidth threshold.

In some examples of the method, apparatuses, and non-transitory computer-readable medium described herein, receiving the CSI reporting configuration may include operations, features, means, or instructions for receiving the CSI reporting configuration that indicates a number of PRBs or subbands as the uplink bandwidth.

In some examples of the method, apparatuses, and non-transitory computer-readable medium described herein, receiving the CSI reporting configuration may include operations, features, means, or instructions for receiving the CSI reporting configuration that indicates at least one uplink bandwidth value, where the full duplex CSI report reports a CSI value for each uplink bandwidth value of the at least one uplink bandwidth value.

In some examples of the method, apparatuses, and non-transitory computer-readable medium described herein, receiving the CSI reporting configuration may include operations, features, means, or instructions for receiving radio resource control (RRC) signaling including the CSI reporting configuration, a medium access control (MAC) control element (CE) including the CSI reporting configuration, downlink control information (DCI) including the CSI reporting configuration, or any combination thereof.

In some examples of the method, apparatuses, and non-transitory computer-readable medium described herein, receiving the CSI reporting configuration may include operations, features, means, or instructions for receiving the CSI reporting configuration includes a flag indicating whether to report CSI for a full duplex mode, a non-full duplex mode, or both, and generating the full duplex CSI report based on the flag.

Some examples of the method, apparatuses, and non-transitory computer-readable medium described herein may further include operations, features, means, or instructions for determining whether to report CSI for the full duplex mode based on a spectrum efficiency threshold.

Some examples of the method, apparatuses, and non-transitory computer-readable medium described herein may further include operations, features, means, or instructions for transmitting capability signaling that indicates support for a full duplex mode in which the UE is capable of simultaneously transmitting and receiving with a serving base station using a same time-frequency resource, where the CSI reporting configuration for full duplex CSI reporting is received based on the capability signaling.

A method of wireless communications by a base station is described. The method may include transmitting a CSI reporting configuration for full duplex CSI reporting, transmitting a CSI-RS based on the CSI reporting configuration, and receiving a full duplex CSI report that includes uplink bandwidth information based on the transmitting the CSI-RS.

An apparatus for wireless communications by a base station is described. The apparatus may include a processor, memory coupled with the processor, and instructions stored in the memory. The instructions may be executable by the processor to cause the apparatus to transmit a CSI reporting configuration for full duplex CSI reporting, transmit a CSI-RS based on the CSI reporting configuration, and receive a full duplex CSI report that includes uplink bandwidth information based on the transmitting the CSI-RS.

Another apparatus for wireless communications by a base station is described. The apparatus may include means for transmitting a CSI reporting configuration for full duplex CSI reporting, transmitting a CSI-RS based on the CSI reporting configuration, and receiving a full duplex CSI report that includes uplink bandwidth information based on the transmitting the CSI-RS.

A non-transitory computer-readable medium storing code for wireless communications by a base station is described. The code may include instructions executable by a processor to transmit a CSI reporting configuration for full duplex CSI reporting, transmit a CSI-RS based on the CSI reporting configuration, and receive a full duplex CSI report that includes uplink bandwidth information based on the transmitting the CSI-RS.

In some examples of the method, apparatuses, and non-transitory computer-readable medium described herein, receiving the full duplex CSI report may include operations, features, means, or instructions for receiving a full duplex CSI report that includes the uplink bandwidth information that indicates CSI for a set of different uplink bandwidths.

In some examples of the method, apparatuses, and non-transitory computer-readable medium described herein, transmitting the CSI reporting configuration may include operations, features, means, or instructions for transmitting the CSI reporting configuration that indicates an uplink bandwidth, where the uplink bandwidth information indicates CSI for the uplink bandwidth.

Some examples of the method, apparatuses, and non-transitory computer-readable medium described herein may further include operations, features, means, or instructions for transmitting an uplink grant and a downlink grant based on the full duplex CSI report, and simultaneously receiving an uplink data transmission based on the uplink grant and transmitting a downlink data transmission based on the downlink grant.

In some examples of the method, apparatuses, and non-transitory computer-readable medium described herein, transmitting the CSI reporting configuration may include operations, features, means, or instructions for transmitting the CSI reporting configuration that indicates an uplink transmission power when measuring a downlink channel status, where the full duplex CSI report indicates full duplex CSI determined based on the uplink transmission power.

In some examples of the method, apparatuses, and non-transitory computer-readable medium described herein, transmitting the CSI reporting configuration may include operations, features, means, or instructions for transmitting the CSI reporting configuration that indicates an uplink multi-antenna scheme when measuring a downlink channel status, where the full duplex CSI report indicates full duplex CSI determined based on the uplink multi-antenna scheme.

In some examples of the method, apparatuses, and non-transitory computer-readable medium described herein, transmitting the CSI reporting configuration may include operations, features, means, or instructions for transmitting the CSI reporting configuration that indicates a CSI-RS repetition scheme, where the full duplex CSI report indicates full duplex CSI determined based on the CSI-RS repetition scheme.

In some examples of the method, apparatuses, and non-transitory computer-readable medium described herein, transmitting the CSI reporting configuration may include operations, features, means, or instructions for transmitting the CSI reporting configuration that indicates an uplink transmission type utilizes a first uplink transmission power of a set of different uplink transmission powers, a first uplink multiple antenna scheme of a set of different multiple antenna schemes, or both.

In some examples of the method, apparatuses, and non-transitory computer-readable medium described herein, receiving the full duplex CSI report may include operations, features, means, or instructions for receiving the full duplex CSI report that indicates a set of CSIs, each CSI of the set of CSIs corresponding to a respective uplink bandwidth value from a list of bandwidth values.

In some examples of the method, apparatuses, and non-transitory computer-readable medium described herein, the list of bandwidth values may be a list of numbers of PRBs, subbands, or both.

In some examples of the method, apparatuses, and non-transitory computer-readable medium described herein, receiving the full duplex CSI report may include operations, features, means, or instructions for receiving the full duplex CSI report that indicates that a respective CSI of the set of CSIs corresponds to a respective uplink bandwidth value from a list of bandwidth values.

In some examples of the method, apparatuses, and non-transitory computer-readable medium described herein, the full duplex CSI report includes a number of CSIs that may be fewer than a number of uplink bandwidth value in the list of bandwidth values.

Some examples of the method, apparatuses, and non-transitory computer-readable medium described herein may further include operations, features, means, or instructions for determining that the full duplex CSI report includes CSI for a subset of uplink bandwidth values from the list of bandwidth values based on a priority order.

In some examples of the method, apparatuses, and non-transitory computer-readable medium described herein, receiving the full duplex CSI report may include operations, features, means, or instructions for receiving the full duplex CSI report that indicates a single CSI and a single uplink bandwidth threshold.

In some examples of the method, apparatuses, and non-transitory computer-readable medium described herein, the single CSI may be valid when uplink bandwidth does not exceed the uplink bandwidth threshold.

In some examples of the method, apparatuses, and non-transitory computer-readable medium described herein, receiving the full duplex CSI report may include operations, features, means, or instructions for receiving the full duplex CSI report that indicates the uplink bandwidth information that reports one or more of an uplink pathloss metric, an uplink power headroom metric, a self-interference cancellation ratio, or any combination thereof.

In some examples of the method, apparatuses, and non-transitory computer-readable medium described herein, receiving the full duplex CSI report may include operations, features, means, or instructions for receiving the full duplex CSI report that indicates the uplink bandwidth information that reports a self-interference cancellation ratio, a non-full duplex CSI, and one of an uplink pathloss metric or an uplink power headroom metric.

In some examples of the method, apparatuses, and non-transitory computer-readable medium described herein, receiving the full duplex CSI report may include operations, features, means, or instructions for receiving the full duplex CSI report that indicates the uplink bandwidth information that reports a power of self-interference metric, an uplink bandwidth threshold, and a non-full duplex CSI.

In some examples of the method, apparatuses, and non-transitory computer-readable medium described herein, the power of self-interference metric may be as reported when uplink bandwidth does not exceed the uplink bandwidth threshold.

In some examples of the method, apparatuses, and non-transitory computer-readable medium described herein, transmitting the CSI reporting configuration may include operations, features, means, or instructions for transmitting the CSI reporting configuration that indicates a number of PRBs or subbands as the uplink bandwidth.

In some examples of the method, apparatuses, and non-transitory computer-readable medium described herein, transmitting the CSI reporting configuration may include operations, features, means, or instructions for transmitting the CSI reporting configuration that indicates at least one uplink bandwidth value, where the full duplex CSI report reports a CSI value for each uplink bandwidth value of the at least one uplink bandwidth value.

In some examples of the method, apparatuses, and non-transitory computer-readable medium described herein, transmitting the CSI reporting configuration may include operations, features, means, or instructions for transmitting RRC signaling including the CSI reporting configuration, a MAC-CE including the CSI reporting configuration, DCI including the CSI reporting configuration, or any combination thereof.

In some examples of the method, apparatuses, and non-transitory computer-readable medium described herein, transmitting the CSI reporting configuration may include operations, features, means, or instructions for transmitting the CSI reporting configuration includes a flag indicating whether to report CSI for a full duplex mode, a non-full-duplex, or both, and generating the full duplex CSI report based on the flag.

Some examples of the method, apparatuses, and non-transitory computer-readable medium described herein may further include operations, features, means, or instructions for determining whether to report CSI for the full duplex mode based on a spectrum efficiency threshold.

Some examples of the method, apparatuses, and non-transitory computer-readable medium described herein may further include operations, features, means, or instructions for determining a radio resource allocation, a downlink transport format for downlink data transfer, and an uplink transport format for uplink data transfer based on the full duplex CSI report, and transmitting an uplink grant and a downlink grant based on the radio resource allocation, the downlink transport format, and the uplink transport format.

Some examples of the method, apparatuses, and non-transitory computer-readable medium described herein may further include operations, features, means, or instructions for estimating the full duplex CSI for the UE based on the CSI report, where the radio resource allocation, the downlink transport format for downlink data transfer, and the uplink transport format for uplink data transfer may be determined based on the estimated full duplex CSI.

In some examples of the method, apparatuses, and non-transitory computer-readable medium described herein, estimating the full duplex CSI for the UE may include operations, features, means, or instructions for estimating the full duplex CSI for the UE based on a pathloss metric, an uplink transmission power headroom metric, a self-interference cancellation ratio, a non-full duplex CSI, or any combination thereof, indicated in the full duplex CSI report, where the radio resource allocation, the downlink transport format for downlink data transfer, and the uplink transport format for uplink data transfer may be determined based on the estimated full duplex CSI.

In some examples of the method, apparatuses, and non-transitory computer-readable medium described herein, estimating the full duplex CSI for the UE may include operations, features, means, or instructions for estimating the full duplex CSI for the UE based on a self-interference metric, an uplink bandwidth threshold, and a non-full duplex CSI indicated in the full duplex CSI report, where the radio resource allocation, the downlink transport format for downlink data transfer, and the uplink transport format for uplink data transfer may be determined based on the estimated full duplex CSI.

Some examples of the method, apparatuses, and non-transitory computer-readable medium described herein may further include operations, features, means, or instructions for receiving, from a UE, capability signaling that indicates support for a full duplex mode in which the UE is capable is simultaneously transmitting and receiving with a serving base station using a same time-frequency resource, wherein the CSI report configuration for full duplex CSI reporting is transmitted based on the capability signaling.

DETAILED DESCRIPTION

Figure 1:
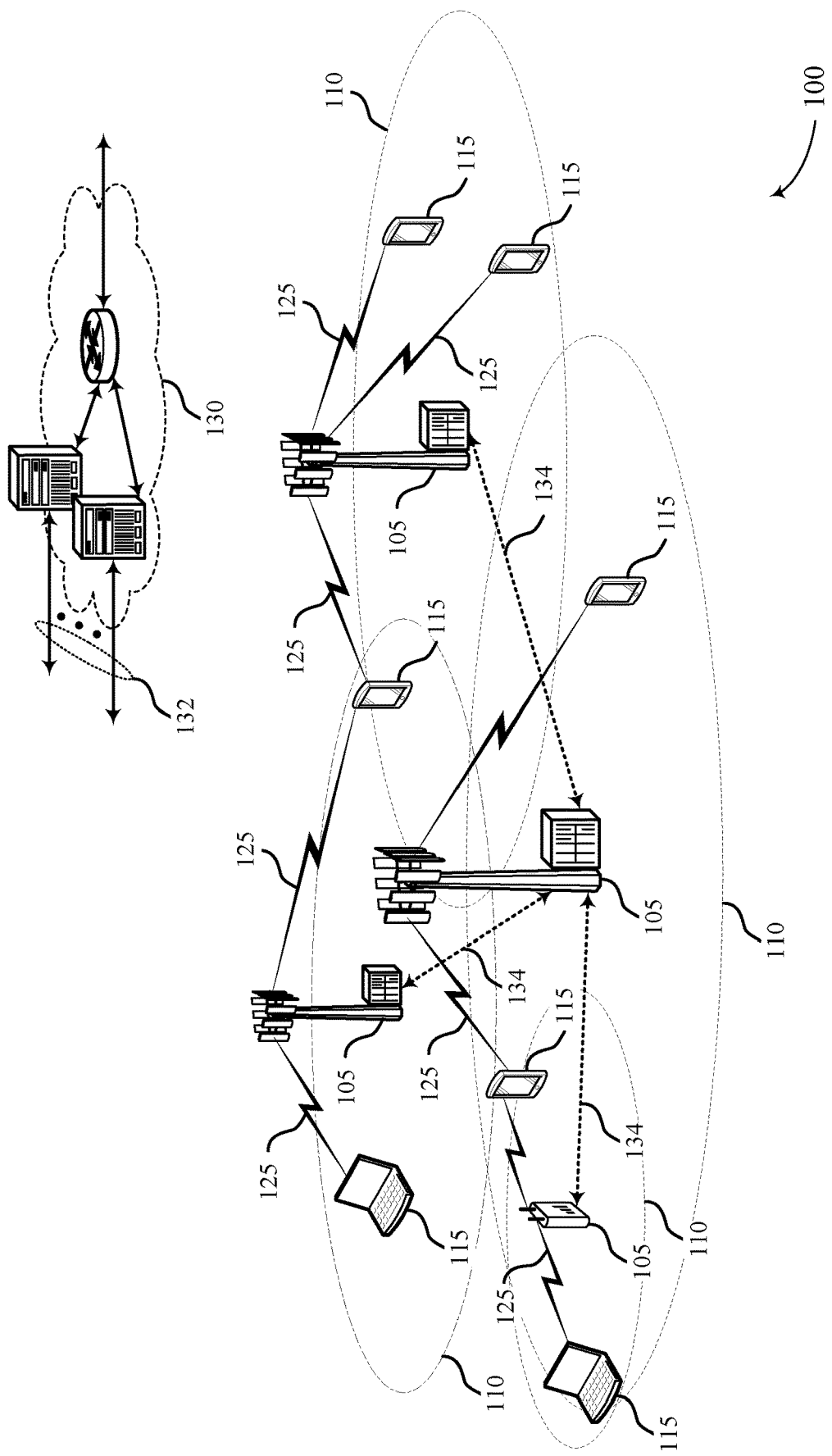
FIG. 1 illustrates an example of a system for wireless communications that supports channel state information (CSI) report related to uplink transmission bandwidth by full duplex-capable user equipment (UE) in accordance with aspects of the present disclosure.

In some wireless communications systems, a user equipment (UE) may include a full duplex capability, where the UE is capable of simultaneous transmission and reception using a same set of time-frequency resources. However, the simultaneous transmission and reception may result in a self-interference that impacts the downlink reception and/or uplink transmission at the UE. Accordingly, a base station may transmit downlink reference signals to the UE for the UE to measure and for which to report the measurements (e.g., channel state information (CSI) for CSI reference signals (CSI-RSs)), where the base station uses the report of the measurements to schedule the simultaneous transmission and reception such that the self-interference has less impact (e.g., by adjusting downlink transmit power, signaling a different uplink transmit power for the UE to use, etc.). In some cases, when reporting the measurements, the UE may not know a granted bandwidth for future uplink data transfers that the base station configures for the full duplex capability and, therefore, may not be able to provide sufficient information to the base station to enable the base station to determine proper scheduling information for the full duplex capability of the UE.

As described herein, a base station may transmit a CSI reporting configuration to a full duplex UE that indicates for the full duplex UE to monitor for CSI-RSs, where the UE may transmit a full duplex CSI report based on the monitoring. In some cases, the full duplex CSI report may include at least in part uplink bandwidth information for the base station to schedule subsequent communications for the full duplex UE. For example, the full duplex CSI report may include CSI for a set of possible uplink bandwidths (e.g., and related information about the possible uplink bandwidths, such as indications of the uplink bandwidths, pathloss, transmission power, self-interference strength, etc.), where the set of possible bandwidths are determined by the UE and/or signaled via a list of bandwidths from the base station. Additionally or alternatively, the base station may indicate a specific uplink bandwidth for the UE to monitor and measure the CSI, and the UE may transmit the full duplex CSI report for the indicated uplink bandwidth.

In some cases, the UE may calculate the full duplex CSI based on information received from the base station and/or based on measurements made by the UE. For example, the base station may indicate an uplink transmission power, a multi-antenna scheme, a CSI-RS repetition scheme, or a combination thereof, for the UE to use when measuring a downlink channel status for the full duplex CSI report. Additionally or alternatively, the UE may calculate the full duplex CSI from measurements based on a number of transmit antennas and a number of receive antennas of the UE, with a certain uplink transmission at resource elements of CSI-RSs, or a combination thereof. As noted above, when transmitting the full duplex CSI report for the set of possible uplink bandwidths, the UE may include related information about the possible uplink bandwidths. Accordingly, based on this related information, the base station may estimate a CSI for any of the possible uplink bandwidths for the UE. Subsequently, based on the estimated CSI or reported CSI from the UE (e.g., if the base station indicates the uplink bandwidth for the UE to report the CSI), the base station may then schedule simultaneous uplink and downlink traffic with the UE.

Aspects of the disclosure are initially described in the context of a wireless communications system. Additionally, aspects of the disclosure are illustrated through an additional wireless communications system, an example of a full duplex operation, and a process flow. Aspects of the disclosure are further illustrated by and described with reference to apparatus diagrams, system diagrams, and flowcharts that relate to CSI report related to uplink transmission bandwidth by full duplex-capable UE.

FIG. 1 illustrates an example of a wireless communications system 100 that supports CSI report related to uplink transmission bandwidth by full duplex-capable UE in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communications systems (e.g., next generation wireless networks, 5G networks, NR, etc.), ultra-high data rates and a wide scope of application scenarios may be expected to be supported. Accordingly, wireless full duplex (FD) communications is an emerging technique and may be capable of doubling the link capacity that can accommodate the ultra-high data rates and wide scope of application scenarios. The main idea behind wireless full duplex may include enabling radio network nodes to transmit and receive simultaneously on a same frequency band and at a same time slot. This simultaneous communication using the same frequency band at the same time may contrast with conventional operations (e.g., half duplex operation, non-full duplex operations, etc.), where transmission and reception either differ in time and/or in frequency. A full duplex network node, such as a base station 105 in a cellular network, may communicate simultaneously in uplink and downlink with two half-duplex terminals (e.g., half-duplex UEs 115) using the same radio resources (e.g., same time-frequency resources). Another typical wireless full duplex application scenario may include one relay node that can communicate simultaneously with an anchor node and a mobile terminal in a one-hop scenario or with two other relay nodes in a multi-hop scenario. It is expected that by doubling each single-link capacity, full duplexing may increase the system throughput in diverse applications in wireless communication networks and also may reduce a transfer latency for time sensitive services.

Besides the above described scenarios, a new emerging scenario may include one UE 115 (e.g., a full duplex-capable UE 115) that is capable of simultaneous transmission and reception using a same time-frequency radio resource (e.g., working in self-full duplex mode). However, rather than the above described scenarios where network throughput may be increased but a single-UE throughput may not be increased, with the full duplex-capable UE 115, a single-UE aggregated downlink and uplink throughput may be increased. Additionally, the full duplex UE 115 (e.g., full duplex-capable UE 115) may increase single-UE aggregated downlink and uplink throughput for cases when both downlink and uplink traffics are high for a single user. In some cases, enabling full duplex transmissions may include a capability of canceling a strong self-interference from downlink to uplink at the full duplex UE 115. For example, current full duplex radio designs may suppress up to 110 dB of such self-interference (e.g., by combining the technologies of beamforming, analog cancellation, digital cancellation, antenna cancellation, etc.).

In some cases, full duplex capabilities may cause different interferences based on the simultaneous communications occurring in different directions. For example, a full duplex base station may communicate with two non-full duplex UEs using a same set of radio resources (e.g., time-frequency resources), where a first non-full duplex UE transmitting a signal in an uplink may generate inter-UE interference to a second non-full duplex UE receiving a signal in a downlink from the full duplex base station. Additionally or alternatively, for a full duplex UE 115, a transmitted signal on an uplink antenna (e.g., to a base station 105) may cause a self-interference on a received signal at a downlink antenna (e.g., from a same or different base station 105). In some cases, mitigating the self-interference may depend on different factors such as a transmission power of the full duplex UE 115, an uplink transmission bandwidth, etc. Accordingly, a scheduling base station 105 may signal for the full duplex UE 115 to adjust a transmission power or to use a specific uplink transmission bandwidth to mitigate the self-interference. For example, the full duplex UE 115 may transmit a CSI report (e.g., based on measuring CSI-RSs) to the base station 105 to enable the base station 105 to determine mitigation techniques for the self-interference at the full duplex UE 115.

Some CSI reports may not support a full duplex capable UE 115. In some cases, the self-interference of a UE 115 under a self-full duplex mode may change (e.g. when the UE 115 moves to another location which may affect the pathloss, when the UE 115 is granted with a different uplink bandwidth for data transfer, etc.). For example, the full duplex UE 115 may use a lower uplink transmit power, the nearer to a base station 105 the full duplex UE 115 is, which may result in the self-interference at the full duplex UE 115 to become weaker. Additionally or alternatively, given a fixed total uplink transmit power for the full duplex UE 115, a larger uplink transmission bandwidth may result in a lower uplink transmit power distributed to one physical RB (PRB), which may further result in a weaker self-interference at the full duplex UE 115. Accordingly, the base station 105 may determine to signal for the full duplex UE 115 to reduce an uplink transmit power or use a larger uplink transmission bandwidth to reduce the self-interference based on measurements provided by the full duplex UE 115 in a CSI report.

However, for conventional CSI reports, when the full duplex UE 115 reports CSI for a downlink data transfer, the full duplex UE 115 may not know a granted bandwidth for an uplink data transfer scheduled by the base station 105 in the future. In some cases, different uplink granted bandwidths may lead to different self-interference strengths and a different downlink signal-to-interference-plus-noise ratio (SINR). Accordingly, the base station 105 may incorrectly determine downlink and uplink transport formats and a radio resource allocation of the full duplex UE 115 if the uplink bandwidth information is unknown (e.g., the full duplex UE 115 reports measurements for an uplink bandwidth different than a configured uplink bandwidth by the base station 105 for the simultaneous uplink and downlink traffic, the full duplex UE 115 does not report measurements for uplink bandwidths, etc.). Therefore, current (e.g., conventional) CSI report methods in which a CSI value is reported without information of an associated uplink bandwidth may not provide sufficient information for the base station 105 to determine proper scheduling results to the full duplex UE 115 (e.g., or a full duplex-capable UE 115).

Wireless communications system 100 may support efficient techniques for a full duplex-capable UE 115 to provide a CSI report to a base station 105 to enable the base station 105 to schedule simultaneous uplink and downlink communications for the full duplex-capable UE 115. For example, the base station 105 may transmit a CSI report configuration to the full duplex-capable UE 115 that indicates for the full duplex-capable UE 115 to report a self-full duplex mode CSI. In some cases, the CSI report configuration may include the full duplex-capable UE 115 to report CSI under the self-full duplex mode with or without an indication of an uplink bandwidth. If the base station 105 does not configure the full duplex-capable UE 115 to transmit an indication of an uplink bandwidth, the full duplex-capable UE 115 may report CSI for multiple possible uplink bandwidths with related configuration information for the possible uplink bandwidths (e.g., indications of the uplink bandwidths, pathloss, transmission power, self-interference strength, etc.). Additionally or alternatively, when configured with the indication of the uplink bandwidth, the full duplex-capable UE 115 may report CSI for the given bandwidth (e.g., indicated uplink bandwidth).

Accordingly, the full duplex-capable UE 115 may calculate and report the self-full duplex mode CSI to the base station 105 according to the received configuration (e.g., together with or separate from a non-self-full duplex mode CSI). The base station 105 may then determine a radio resource allocation and transport format for downlink data transfer (e.g., in a physical downlink shared channel (PDSCH)) and for uplink data transfer (e.g., in a physical uplink shared channel (PUSCH)) under the self-full duplex mode. Subsequently, the base station 105 may send a downlink grant and uplink grant to the full duplex-capable UE 115, and the data transfer under the self-full duplex mode may commence (e.g., may be executed).

Figure 2:
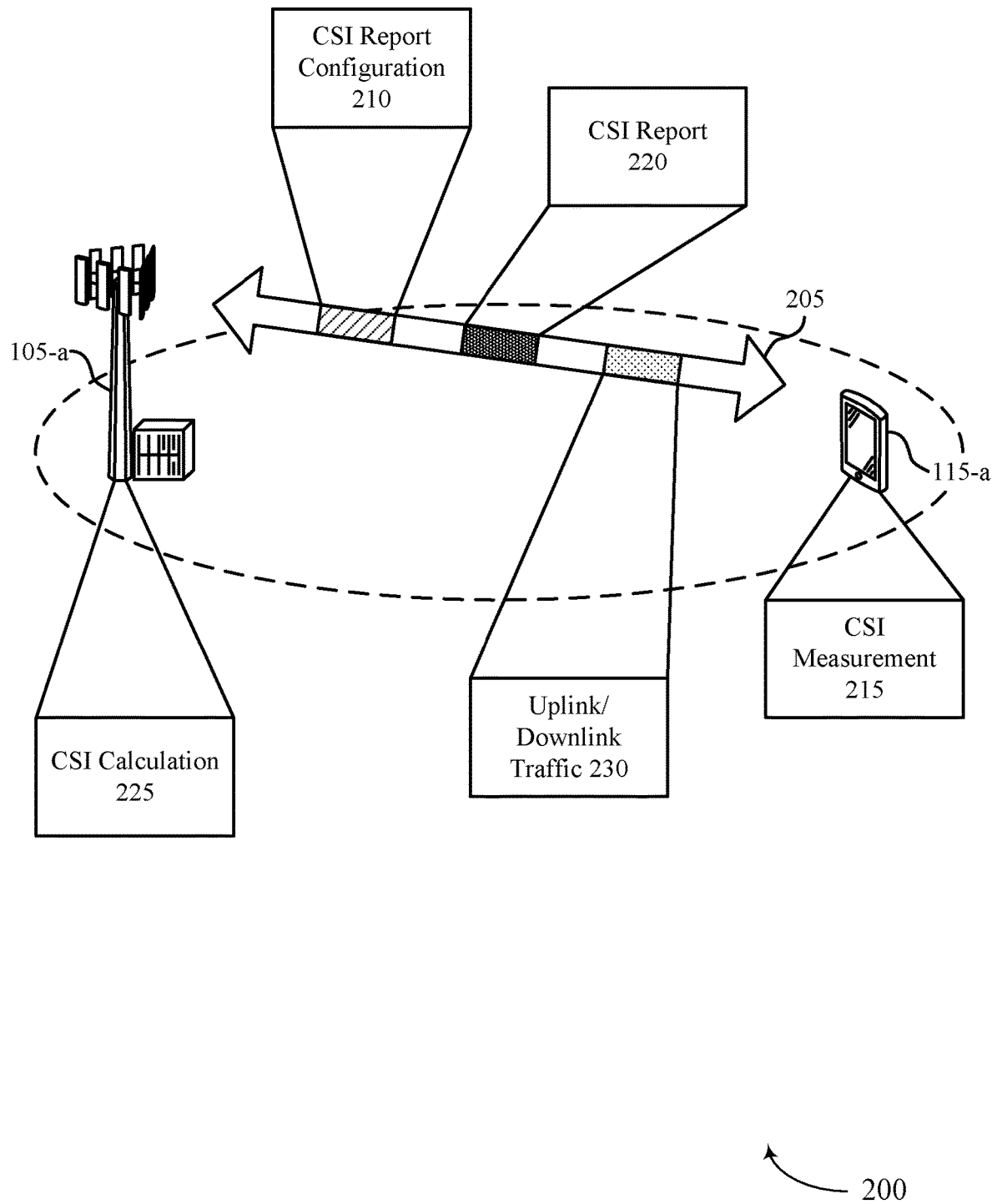
FIG. 2 illustrates an example of a wireless communications system that supports CSI report related to uplink transmission bandwidth by full duplex-capable UE in accordance with aspects of the present disclosure.

FIG. 2 illustrates an example of a wireless communications system 200 that supports CSI report related to uplink transmission bandwidth by a full duplex capable UE in accordance with aspects of the present disclosure. In some examples, wireless communications system 200 may implement aspects of wireless communications system 100. For example, wireless communication system 200 may include a base station 105-*a* and a UE 115-*a*, which may be examples of corresponding base stations 105 and UEs 115, respectively, as described with reference to FIG. 1. In some cases, base station 105-*a* and UE 115-*a* may communicate on resources of a carrier 205. Additionally, UE 115-*a* may be described as a full duplex-capable UE 115 or full duplex UE 115 as described above with reference to FIG. 1, where UE 115-*a* is capable of simultaneously receiving downlink traffic and transmitting uplink traffic with base station 105-*a* on a same set of frequency resources of carrier 205 at a same given time.

As described herein, to mitigate a self-interference at UE 115-*a* that results from the full duplex capability and the uplink traffic interfering with the downlink traffic, base station 105-*a* may configure UE 115-*a* to transmit a CSI report that includes uplink bandwidth information, where base station 105-*a* uses the uplink bandwidth information to schedule the uplink and downlink traffic to reduce the self-interference (e.g., by indicating a lower uplink transmit power, a larger uplink transmission bandwidth, etc.). For example, base station 105-*a* may transmit a CSI report configuration 210 to UE 115-*a*, where UE 115-*a* performs a CSI measurement 215 based on CSI report configuration 210 (e.g., where CSI measurement 215 includes calculations performed by UE 115-*a* for full duplex CSI). Subsequently, UE 115-*a* may then transmit a CSI report 220 (e.g., together with or separate from a non-self-full duplex mode CSI) that includes CSI measurement 215 (e.g., uplink bandwidth information). In some cases, base station 105-*a* may perform a CSI calculation 225 based on CSI report 220. Accordingly, base station 105-*a* and UE 115-*a* may then transmit uplink/downlink traffic 230 on carrier 205, where uplink/downlink traffic 230 may include simultaneous uplink traffic (e.g., on a PUSCH) and downlink traffic (e.g., on a PDSCH) on same frequency resources of carrier 205 at a same time.

In some cases, when transmitting CSI report configuration 210, base station 105-*a* may configure UE 115-*a* to report CSI under a self-full duplex mode without an indication of an uplink bandwidth to use, and UE 115-*a* may report CSI for multiple possible uplink bandwidths and related information for the possible uplink bandwidths in CSI report 220 (e.g., information on the uplink bandwidths, pathloss, transmission power, self-interference strength, etc.). Additionally or alternatively, base station 105-*a* may configure UE 115-*a* to report CSI under the self-full duplex mode with an indication of an uplink bandwidth to use, and UE 115-*a* may report CSI for the given uplink bandwidth in CSI report 220. Accordingly, base station 105-*a* may transmit CSI report configuration 210 with the uplink bandwidth information, which may enable UE 115-*a* to calculate a power of the self-interference when it generates the self-full duplex mode CSI. Additionally, UE 115-*a* may transmit CSI report 220 that contains the self-full duplex mode CSI and any associated uplink bandwidth information (e.g., where the content of CSI report 220 may include different options). Accordingly, based on CSI report 220, base station 105-*a* may determine the self-full duplex mode CSI for indicated uplink bandwidths directly or may calculate self-full duplex mode CSI for the intended uplink bandwidths indirectly.

To assist or guide UE 115-*a* in a self-full duplex mode CSI calculation for CSI measurement 215, base station 105-*a* may send information with CSI report configuration 210. For example, base station 105-*a* may transmit, to UE 115-*a*, an indication of an uplink transmission power to use when measuring a downlink channel status for CSI measurement 215 to include in CSI report 220. In some cases, the possible indicated information for the uplink transmission power may include no uplink transmission (e.g., zero-power uplink), a same transmission power spectrum as a PUSCH (e.g., full-power uplink), a certain percentage change (e.g., 3 dB increase or decrease) of a transmission power spectrum compared with the PUSCH, etc. Additionally or alternatively, base station 105-*a* may transmit, to UE 115-*a*, an indication of an uplink multi-antenna scheme to use when measuring the downlink channel status for CSI measurement 215 to include in CSI report 220. In some cases, the possible indicated information for the uplink multi-antenna scheme may include an indication of a single-antenna transmission, a spatial frequency block coding (SFBC), a spatial precoding/multiplexing with one or multiple precoding matrixes, etc. If base station 105-*a* does not send any such information in CSI report configuration 210 (e.g., the indication of the uplink transmission power, the uplink multi-antenna scheme, etc.), UE 115-*a* may determine how to send an uplink transmission (e.g., CSI report 220) when measuring a downlink channel status (e.g., up to UE implementation).

Additionally or alternatively, to assist UE 115-*a* in the self-full duplex mode CSI calculation for CSI measurement 215, base station 105-*a* may indicate for UE 115-*a* usage of CSI-RS repetition for measuring a number of CSI-RSs, where a configured CSI-RS(s) may be sent repeatedly in multiple time occasions in accordance with a CSI-RS repetition scheme. Accordingly, UE 115-*a* may use these occasions to measure the self-interference powers with different uplink transmission powers, where one occasion may correspond to one transmission power and leads to one self-interference power. UE 115-*a* may generate a CSI under the self-interference caused by each of the different uplink transmission powers. Subsequently, UE 115-*a* may then transmit the different CSIs (e.g., and the resulting self-interference powers) in CSI report 220.

After receiving CSI report configuration 210, UE 115-*a* may perform CSI measurement 215 to calculate the self-full duplex mode CSI. For example, the CSI measurement 215 may assume that UE 115-*a* contains $M_t$ transmit antennas and $M_r$ receive antennas under self-full duplex mode and that base station 105-*a* has $M'_t$ transmit antennas for downlink transmissions. Subsequently, UE 115-*a* may measure a downlink channel status that results in a downlink signal matrix (H) with a size of $M_r \times M'_t$ without uplink transmissions (e.g., zero-power uplink) at resource elements of the CSI-RSs. Then, UE 115-*a* may add an impact of self-interference on top of the measured downlink channel status. For example, UE 115-*a* may measure a self-interference matrix (H') with a size of $M_r \times M_t$ corresponding to a certain uplink transmission bandwidth. UE 115-*a* may then calculate an SINR by mitigating the self-interference over the received signal (e.g., by projecting the downlink signal matrix onto the null subspace of the self-interference matrix, by whitening a composite interference-plus-noise matrix that includes the sum of self-interference matrix and a non-full duplex interference-plus-noise matrix, etc.). Accordingly, UE 115-*a* may generate a full duplex-CSI based on the downlink channel status and the impact of the self-interference and may transmit the full duplex-CSI in CSI report 220. Additionally or alternatively, UE 115-*a* may measure the downlink channel status with a certain uplink transmission at resource elements of CSI-RS. The possible uplink transmission type for the certain uplink transmission may include different transmission powers, different uplink multiple-antenna scheme, etc., which may be indicated by base station 105-*a* or determined by UE 115-*a* itself.

When transmitting CSI report 220 where base station 105-*a* configures UE 115-*a* to report CSI under self-full duplex mode without indication of an uplink bandwidth to monitor and measure (e.g., measure CSI-RSs on the uplink bandwidth), UE 115-*a* may report CSI to support data transfer under a self-full duplex mode according to one or more options. For example, UE 115-*a* may report multiple CSIs in CSI report 220, where each CSI corresponds to one of a list of uplink bandwidth values (e.g., a list of numbers of PRBs or subbands). Accordingly, UE 115-*a* may provide accurate CSIs for all uplink bandwidth values in the reported list. In some cases, the number of CSIs may be indicated in CSI report configuration 210 by base station 105-*a* or determined by UE 115-*a*. If the number of CSIs sent by UE 115-*a* is less than a number of uplink bandwidth values indicated by base station 105-*a*, UE 115-*a* may indicate which uplink bandwidth is associated with which CSI.

When an uplink control channel resource for reporting CSI is limited, a priority rule may be regulated to prioritize the CSIs with different uplink bandwidth values. For example, CSIs in CSI report 220 with low-priority may be dropped if the uplink control channel resource is used up. In some cases, the sequence of multiple uplink bandwidth values in CSI report configuration 210 message may be used as the priority order. Additionally or alternatively, CSIs for smaller uplink bandwidth values may have higher priority because a transport format determined from CSI with smaller uplink bandwidths may not cause transfer failure when a larger uplink bandwidth is scheduled.

In a different option, UE 115-*a* may report one CSI and one uplink bandwidth threshold in CSI report 220, where when an uplink bandwidth for a particular CSI is not larger than this uplink bandwidth threshold, the corresponding CSI may be considered valid (e.g., and not valid if the uplink bandwidth is larger than the uplink bandwidth threshold). For example, when an uplink bandwidth is not larger than this uplink bandwidth threshold, the uplink receive power may be equal to a target receive power value ($P_0$), and, hence, the uplink transmission power may be saturated and be kept to be a fixed value ($P_{satu}$). For uplink bandwidth values which are larger than the reported uplink bandwidth threshold, since the uplink transmission power is smaller than $P_{satu}$, if using the reported CSI to generate a modulation and coding scheme (MCS) (e.g., data rate) in scheduling, the generated MCS may be under-estimated, and, hence, the generated MCS may cause spectrum efficiency loss. Accordingly, based on providing CSIs with an uplink bandwidth threshold, UE 115-*a* may provide accurate CSI for one part of uplink bandwidth values which are not larger than the reported uplink bandwidth threshold, thereby consuming less uplink signaling overhead.

Additionally or alternatively, UE 115-*a* may report additional information on the possible uplink bandwidths when transmitting CSI report 220. For example, UE 115-*a* may report information on uplink pathloss, uplink power headroom, self-interference power, etc., where base station 105-*a* may then estimate a full duplex-mode CSI based on this information. For example, UE 115-*a* may report an indication of a pathloss, an uplink transmit power headroom, a self-interference cancellation ratio, or a combination thereof, together with a non-self-full duplex mode CSI included in CSI report 220. Subsequently, base station 105-*a* may calculate an uplink transmit power for any uplink bandwidth, calculate the power of self-interference, and estimate the self-full duplex mode CSI, which enables base station 105-*a* to determine the radio resource assignment and transport format of self-full duplex mode for any uplink bandwidth. Additionally or alternatively, UE 115-*a* may report the power of self-interference and the uplink bandwidth threshold (e.g., when an uplink bandwidth is not larger than this uplink bandwidth threshold, the power of self-interference is the reported value) together a non-full duplex CSI in CSI report 220.

Accordingly, base station 105-*a* may estimate CSI for any uplink bandwidth value based on these reports, thereby consuming a lower uplink signaling overhead. In some cases, reporting an uplink transmit power headroom may be based on reference format or a preconfigured uplink bandwidth. Additionally, in conventional systems, a power headroom report (PHR) may be transmitted by UE 115-*a* via a MAC control element (MAC CE), which is decoded together with a PUSCH payload. As such, to obtain the information at the same time, power headroom information may be added into CSI report 220, so that the power headroom may be decoded together with the other CSI metrics.

Based on the information received in CSI report 220, base station 105-a may estimate the self-full duplex mode CSI for UE 115-a as part of CSI calculation 225. For example, when base station 105-a receives CSI report 220 after configuring UE 115-a without the indication of the uplink bandwidth to monitor and measure, CSI report 220 may include a pathloss (PL), an uplink transmit power headroom (PH), a self-interference cancellation ratio ($D_{si}$) (e.g., together with the non-self-full duplex mode CSI), and base station 105-a may estimate the self-full duplex mode CSI for any uplink bandwidth ($M_{ul}$). First, base station 105-a may calculate an uplink transmit power per PRB ($P_{tx,PRB}$) according to an uplink power control formula.

If pathloss (PL) is received, base station 105-a may calculate an uplink bandwidth threshold ($M_{th}$) based on $$M_{th} = \left\lfloor 10^{\frac{1}{10}(P_{MAX} - P_0 - \alpha \cdot PL - \Delta_{TF} - f)} \right\rfloor,$$

where $P_{MAX}$ may denote a maximum uplink transmit power, $P_0$ may denote a target uplink received power per PRB, $\alpha$ may denote a pathloss multiplier, $\Delta_{TF}$ may denote a power margin related to modulation scheme, and f may denote a closed-loop power control value. Subsequently, base station 105-a may then calculate $P_{tx,PRB}$ depending on a relation between $M_{ul}$ and $M_{th}$. For example, if $M_{ul} \leq M_{th}$, base station 105-a may calculate $P_{tx,PRB} = P_0 + \alpha \cdot PL + \Delta_{TF} + f$. Alternatively or additionally, if $M_{ul} > M_{th}$, base station 105-a may calculate $P_{tx,PRB} = P_{MAX} - 10 \log_{10}(M_{ul})$. In some cases, if a modulation scheme is uncertain, $\Delta_{TF}$ may be set to zero. Additionally or alternatively, if closed-loop power control is unused, f may be set to zero. Additionally, $P_{MAX}$, $P_0$ and a may be hard coded or configured in a high layer message (e.g., RRC signaling, system information block (SIB), etc.).

Additionally or alternatively, if uplink transmit power headroom (PH) (e.g., based on a reference format) is received, base station 105-a may calculate $P_{tx,PRB}$ depending on the value of PH. For example, if PH≤0, base station 105-a may calculate $P_{tx,PRB} = P_{MAX} - 10 \log_{10}(M_{ul})$. Alternatively, if PH>0, base station 105-a may first calculate the UL bandwidth threshold $$M'_{th} = \left\lfloor 10^{\frac{PH}{10}} \right\rfloor.$$

Then, if $M_{ul} \leq M'_{th}$, base station 105-a may calculate $P_{tx,PRB} = P_{MAX} - PH$. Alternatively, if $M_{ul} \geq M'_{th}$, base station 105-a may calculate $P_{tx,PRB} = P_{MAX} - 10 \log_{10}(M_{ul})$. After calculating $P_{tx,PRB}$, base station 105-a may then calculate a power of self-interference. For example, the power of self-interference ($P_{si}$) may be equal to an uplink transmit power per PRB subtracting the self-interference cancellation ratio (i.e., $P_{si} = P_{tx,PRB} - D_{si}$).

Base station 105-a may then estimate a self-full duplex mode CSI based on the power of self-interference. First, base station 105-a may calculate an SINR value from the received non-self-full duplex mode CSI, denoted as non-full duplex SINR value ($\gamma_{NFD}$). Base station 105-a may then calculate a composite interference-plus-noise power ($P_{c-IpN}$) by adding the interference-plus-noise power at the receiver under non-self-full duplex mode ($P_{IpN}$) and the power of self-interference $P_{si}$ $$\left(i.e.\ P_{c-IpN} = 10 \log_{10}\left(10^{\frac{P_{c-IpN}}{10}} + 10^{\frac{P_{si}}{10}}\right)\right).$$

Subsequently, base station 105-a may then calculate the full duplex SINR value based on the non-full duplex SINR value and the interference boost due to self-interference. For example, the full duplex SINR value ($\gamma_{FD}$) may be equal to the non-full duplex SINR value ($\gamma_{NFD}$) subtracting the interference boost value (i.e. $\gamma_{FD} = \gamma_{NFD} - (P_{c-IpN} - P_{IpN})$). Base station 105-a may then determine a transport format for uplink/downlink traffic 230 based on the full duplex SINR value and non-full duplex CSI (e.g., based on base station implementation). In general, a smaller SINR value may lead to a smaller channel quality indicator (CQI) and/or a smaller rank indicator (RI). In some cases, if the self-interference cancellation ratio ($D_{si}$) is based on a long-term measurement, the self-interference cancellation ratio may be reported in a high-layer message (e.g., RRC message). Alternatively or additionally, if the self-interference cancellation ratio is based on a short-term measurement, the self-interference cancellation ratio may be reported in a low-layer message (e.g., MAC CE, downlink control information (DCI) message), etc.).

Additionally or alternatively, when UE 115-a reports the power of self-interference and the uplink bandwidth threshold, base station 105-a may receive the corresponding values in CSI report 220. For example, base station 105-a may receive the power of self-interference ($\overline{P}_{si}$) and the uplink bandwidth threshold ($M_{th}$, where if an uplink bandwidth is not larger than this uplink bandwidth threshold, the power of self-interference is the reported value) together with the non-full duplex CSI. Accordingly, base station 105-a may estimate the self-full duplex mode CSI for any uplink bandwidth ($M_{ul}$) based on a relationship with the uplink bandwidth threshold ($M_{th}$). For example, base station 105-a may calculate the power of self-interference ($P_{si}$) by if $M_{ul} \leq M_{th}$, then $P_{si} = \overline{P}_{si}$. Alternatively or additionally, if $M_{ul} > M_{th}$, then $$P_{si} = \overline{P}_{si} \cdot \frac{M_{th}}{M_{ul}}.$$

Accordingly, base station 105-a may then estimate the self-full duplex mode CSI using the power of self-interference ($P_{si}$) based on the equations described above.

In some cases, as described above, base station 105-a may configure UE 115-a to report CSI under self-full duplex mode with the indication of the uplink bandwidth to use. For example, this indication of the uplink bandwidth may be added into CSI report configuration 210 (e.g., in the form of the number of PRBs or subbands, where the size of one subband is preconfigured). For a one time of sending CSI report configuration 210, one uplink bandwidth value or a set of uplink bandwidth values may be indicated, and UE 115-a may be requested to report CSI for each of these values. The information of the uplink bandwidth may be contained in an RRC layer message, a MAC layer message (e.g., MAC CE), a physical (PHY) layer message (e.g., a DCI message), or combination thereof. Accordingly, UE 115-*a* may then report CSI for the given uplink bandwidth in CSI report 220. That is, when an uplink bandwidth is indicated in CSI report configuration 210, UE 115-*a* may report the CSI with the indicated uplink bandwidth (e.g., and not CSI values for possible uplink bandwidths or the related information, such as pathloss, power headroom, self-interference power, etc.).

Additionally, self-full duplex mode CSI and non-self-full duplex mode CSI may be reported together by UE 115-*a* in CSI report 220. In some cases, a flag may be used in CSI report 220 to indicate whether one CSI is for self-full duplex mode or for non-self-full duplex mode. In some cases, UE 115-*a* may determine whether self-full duplex mode CSI is reported or not. In this case, normally a threshold on spectrum efficiency (e.g., or other equivalent metrics) may be hard coded or configured to UE 115-*a*. For example, when the self-full duplex mode transfer performance is weaker than this threshold (e.g., when spectrum efficiency under self-full duplex mode is smaller than the threshold or when the ratio of the spectrum efficiency under self-full duplex mode over spectrum efficiency under non-self-full duplex mode is smaller than the threshold) UE 115-*a* may not report the self-full duplex mode CSI. In some cases, UE 115-*a* may determine whether to transmit a self-full duplex mode CSI or a non-self-full duplex mode CSI based on an aggregated throughput of downlink data transfer and uplink data transfer.

After receiving CSI report 220 and/or performing CSI calculation 225, base station 105-*a* may determine a scheduling result of the self-full duplex mode for UE 115-*a*. For example, according to a specific method (e.g., measuring a sounding reference signal (SRS) or demodulation reference signal (DMRS) sent by UE 115-*a*), base station 105-*a* may determine an uplink channel status associated with a certain uplink transmission bandwidth. In some cases, different uplink transmission bandwidths may lead to different uplink transmission powers per PRB. Based on CSI report 220 sent by UE 115-*a*, base station 105-*a* may determine the downlink channel status associated with a certain uplink transmission bandwidth. In some cases, different uplink transmission bandwidths may lead to different self-interference powers per PRB.

Subsequently, base station 105-*a* may then determine an actual uplink transmission bandwidth, resource allocation, and transport format in full duplex communications to and from UE 115-*a* simultaneously for uplink/downlink traffic 230. For example, base station 105-*a* may calculate achievable data rates for uplink data transfer and/or downlink data transfer for a certain full duplex communication bandwidth (i.e., uplink transmission bandwidth or downlink transmission bandwidth in self-full duplex mode). Additionally, in some cases where the scheduling objective may include a maximum aggregated data rate in both downlink and uplink for a single UE (e.g., UE 115-*a*), base station 105-*a* may determine, for a certain full duplex communication bandwidth, whether to work with uplink data transfer only (e.g., non-self-full duplex mode), downlink data transfer only (e.g., non-self-full duplex mode), or simultaneous uplink/downlink data transfer (e.g., self-full duplex mode) according to the comparison of the achievable aggregated data rates.

Based on the above described techniques, UE 115-*a* (e.g., a full duplex-capable UE 115) may report a self-full duplex mode CSI by associating CSI with an uplink transmission bandwidth. Accordingly, base station 105-*a* may determine CSIs with multiple or all possible uplink transmission bandwidths and, thus, may flexibly and accurately make downlink and uplink scheduling for subsequent communications for the self-full duplex mode with UE 115-*a*. Additionally, the reliability and throughput of a self-full duplex mode transfer (e.g., simultaneous downlink and uplink data transfer for a single UE 115) may be improved.

Figure 3:
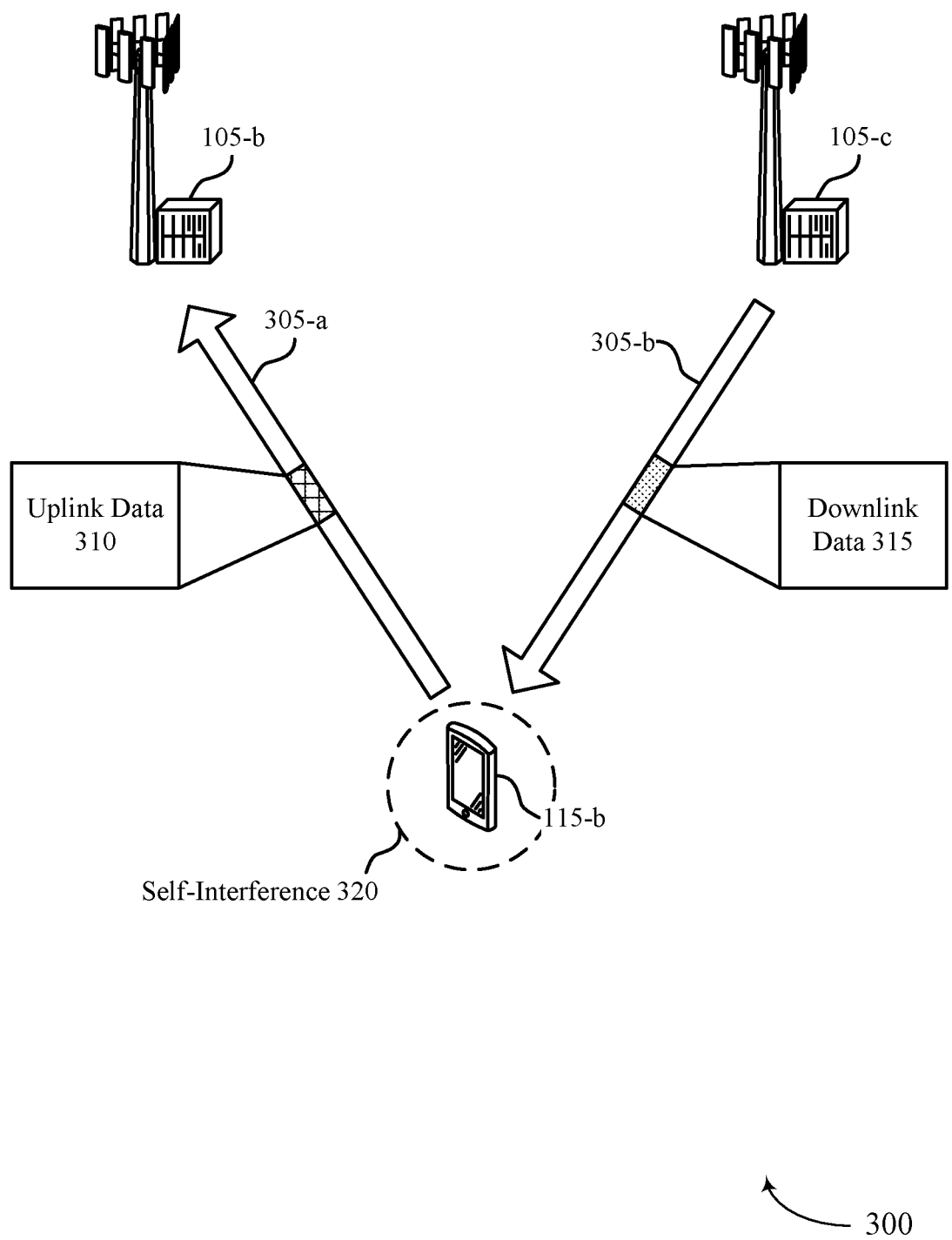
FIG. 3 illustrates an example of a full duplex operation that supports CSI report related to uplink transmission bandwidth by full duplex-capable UE in accordance with aspects of the present disclosure.

FIG. 3 illustrates an example of a full duplex operation 300 that supports CSI report related to uplink transmission bandwidth by full duplex capable UE in accordance with aspects of the present disclosure. In some examples, full duplex operation 300 may implement aspects of wireless communications systems 100 and 200. For example, full duplex operation 300 may include a base station 105-*b*, a base station 105-*c*, and a UE 115-*b*, which may be examples of corresponding base stations 105 and UEs 115, respectively, as described with reference to FIGS. 1-2. Additionally, full duplex operation 300 may illustrate a scenario for communications between a base station 105 (e.g., base station 105-*b* and base station 105-*c*) and a full-duplex capable UE 115 (e.g., UE 115-*b*).

In some cases, a base station 105 may include a set of downlink antenna(s) (e.g., base station 105-*c*) and a set of uplink antenna(s) (e.g., base station 105-*b*). These two antenna sets may be located remotely from each other to reduce their inter-talk interference. Additionally or alternatively, the two antenna sets may be located closely to each other or be integrated as one antenna set if the inter-talk interference can be mitigated at a sufficiently high degree. In some cases, the two antenna sets may be separate base stations 105 as shown, where UE 115-*b* communicates with the two base stations 105 in both uplink and downlink directions at the same time.

Accordingly, UE 115-*b* may be capable of transmitting uplink data 310 on resources of a carrier 305-*a* to base station 105-*b* and of receiving downlink data 315 on resources of a carrier 305-*b* from base station 105-*c*, where carriers 305-*a* and 305-*b* include a same time-frequency radio resource for the uplink data 310 and downlink data 315. In some cases, the full duplex-capable UE 115-*b* may not always operate under a self-full duplex mode. For example, whether UE 115-*b* operates under self-full duplex mode or non-self-full duplex mode may depend on one or more factors, such as whether the self-full duplex mode can achieve a higher data rate than the non-self-full duplex mode.

However, a self-interference 320 may be caused by the transmitted uplink data 310 to the received downlink data 315 in the self-full duplex mode. In some cases, the self-interference 320 may be sufficiently mitigated so that both the downlink data 315 transfer and the uplink data 310 transfer are effective. In some cases, due to different product design and hardware/software implementation, the capabilities of mitigating self-interference by a full duplex-capable UE 115 might be different. In some cases, such capability for a given UE 115 to mitigate the self-interference 320 may be fixed. Additionally or alternatively, such capability for a given UE 115 to mitigate the self-interference 320 may be variant with an uplink transmission power of the UE 115, an uplink transmission bandwidth for the uplink data 310, or any other factors. Accordingly, the techniques described herein may enable a base station 105 and UE 115 to mitigate the self-interference 320.

Figure 4:
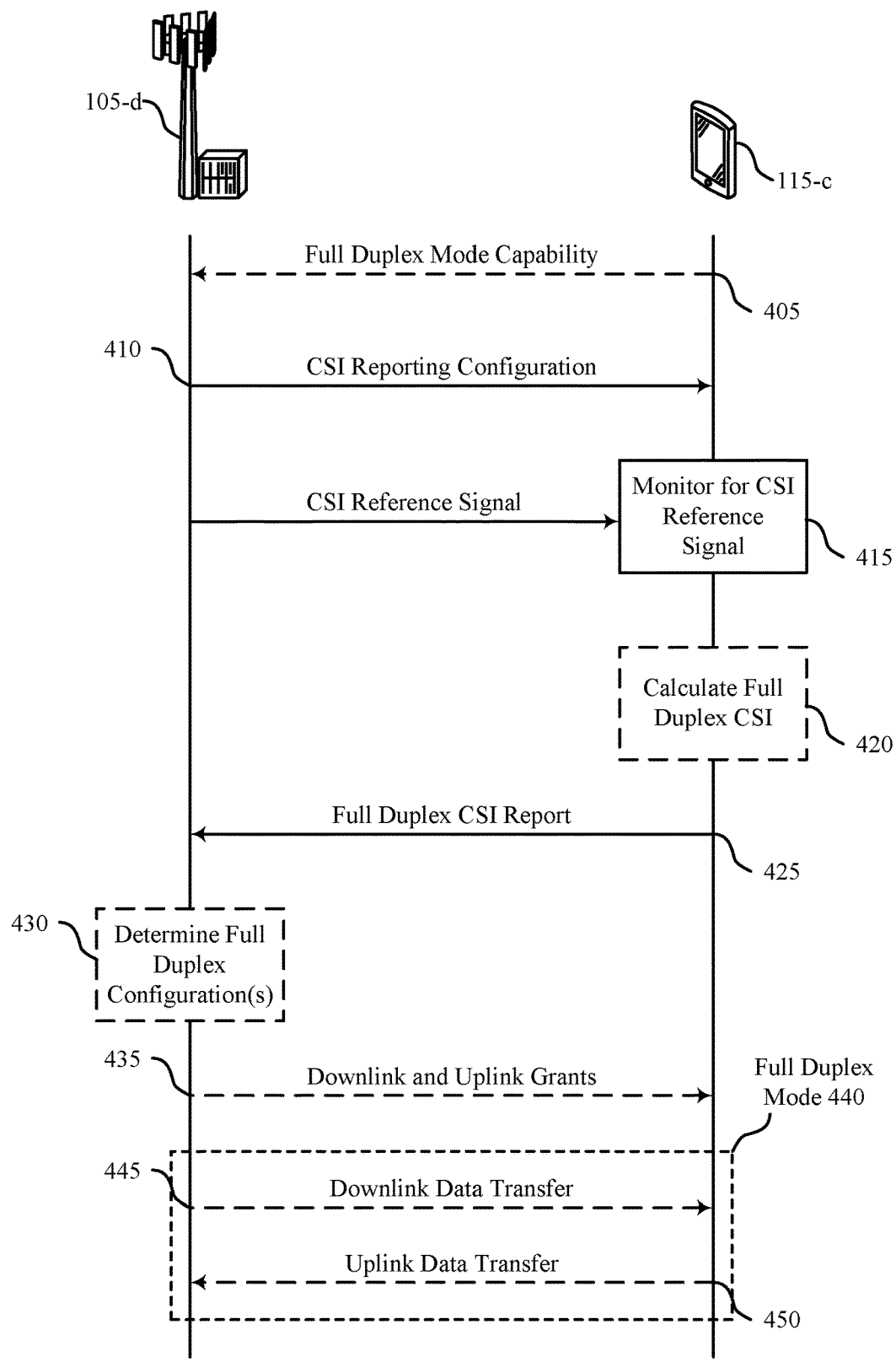
FIG. 4 illustrates an example of a process flow that supports CSI report related to uplink transmission bandwidth by full duplex-capable UE in accordance with aspects of the present disclosure.

FIG. 4 illustrates an example of a process flow 400 that supports CSI report related to uplink transmission bandwidth by full duplex capable UE in accordance with aspects of the present disclosure. In some examples, process flow 400 may implement aspects of wireless communications systems 100 and/or 200. Process flow 400 may include a base station 105-*d* and a UE 115-*c*, which may be examples of corresponding base stations 105 and UEs 115, respectively, as described above with reference to FIGS. 1-3. As described herein, UE 115-*c* may be a full-duplex capable UE 115 as described above.

In the following description of the process flow 400, the operations between UE 115-*c* and base station 105-*d* may be transmitted in a different order than the order shown, or the operations performed by base station 105-*d* and UE 115-*c* may be performed in different orders or at different times. Certain operations may also be left out of the process flow 400, or other operations may be added to the process flow 400. It is to be understood that while base station 105-*d* and UE 115-*c* are shown performing a number of the operations of process flow 400, any wireless device may perform the operations shown.

At 405, UE 115-*c* may transmit capability signaling that indicates support for a full duplex mode in which UE 115-*c* is capable of simultaneously transmitting and receiving with a serving base station (e.g., base station 105-*d*) using a same time-frequency resource.

At 410, UE 115-*c* may receive, from base station 105-*d*, a CSI reporting configuration for full duplex CSI reporting (e.g., for transmitting a full duplex CSI report). For example, UE 115-*c* may receive the CSI reporting configuration for full duplex CSI reporting based on the capability signaling. In some cases, the CSI reporting configuration may indicate an uplink bandwidth, where the uplink bandwidth information indicates CSI for the uplink bandwidth. Additionally or alternatively, the CSI reporting configuration may indicate an uplink transmission power when measuring a downlink channel status, where the full duplex CSI report indicates full duplex CSI determined based on the uplink transmission power. In some cases, the CSI reporting configuration may indicate an uplink multi-antenna scheme when measuring a downlink channel status, where the full duplex CSI report indicates full duplex CSI determined based on the uplink multi-antenna scheme.

Additionally or alternatively, the CSI reporting configuration may indicate a CSI-RS repetition scheme, where the full duplex CSI report indicates full duplex CSI determined based on the CSI-RS repetition scheme. In some cases, the CSI reporting configuration may indicate a number of PRBs or subbands as the uplink bandwidth. Additionally or alternatively, the CSI reporting configuration may indicate at least one uplink bandwidth value, where the full duplex CSI report reports a CSI value for each uplink bandwidth value of the at least one uplink bandwidth value. In some cases, UE 115-*c* may receive the CSI reporting configuration via RRC signaling, a MAC CE, a DCI, or a combination thereof.

At 415, UE 115-*c* may monitor for a CSI-RS based on the CSI reporting configuration. Additionally, in some cases, base station 105-*d* may transmit the CSI-RS based on the CSI reporting configuration.

At 420, UE 115-*c* may calculate full duplex CSI based on the CSI reporting configuration and the monitoring, where the full duplex CSI report indicates the calculated full duplex CSI. In some cases, UE 115-*c* may measure a downlink channel status based on a first number of transmit antennas and a second number of receive antennas of UE 115-*c*, determining a self-interference metric using the first number of transmit antennas and the second number of receive antennas, and calculate the full duplex CSI based on the downlink channel status and the self-interference metric. Additionally or alternatively, UE 115-*c* may measure a downlink channel status for an uplink transmission at one or more resource elements on the CSI-RS and may calculate the full duplex CSI based on the downlink channel status and a transmission type of the uplink transmission. Accordingly, when measuring a downlink channel status for an uplink transmission at one or more resource elements on the CSI-RS, the CSI reporting configuration may indicate the uplink transmission type utilizes a first uplink transmission power of a set of different uplink transmission powers, a first uplink multiple antenna scheme of a set of different multiple antenna schemes, or both.

Additionally, the CSI reporting configuration may include a flag indicating whether to report CSI for a full duplex mode, a non-full duplex mode, or both, and may generate the full duplex CSI report based on the flag. In some cases, UE 115-*c* may determine whether to report CSI for the full duplex mode based on a spectrum efficiency method.

At 425, UE 115-*c* may transmit the full duplex CSI report that includes uplink bandwidth information based on the monitoring. In some cases, UE 115-*c* may transmit a full duplex CSI report that includes the uplink bandwidth information that indicates CSI for a set of different uplink bandwidths. Additionally or alternatively, UE 115-*c* may transmit the full duplex CSI report that indicates a set of CSIs, where each CSI of the set of CSIs corresponds to a respective uplink bandwidth value from a list of bandwidth values. In some cases, the list of bandwidth values may include a list of numbers of PRBs, subbands, or both. Additionally, UE 115-*c* may then transmit the full duplex CSI report indicating that a respective CSI of the set of CSIs corresponds to a respective uplink bandwidth value from a list of bandwidth values. Additionally, the full duplex CSI report may include a number of CSIs that is fewer than a number of uplink bandwidth value in the list of bandwidth values, and UE 115-*c* may select a subset of uplink bandwidth values from the list of bandwidth values on which to report CSI based on a priority order.

In some cases, UE 115-*c* may transmit the full duplex CSI report that indicates a single CSI and a single uplink bandwidth threshold. Accordingly, the single CSI may be considered valid when an uplink bandwidth does not exceed the uplink bandwidth threshold. Additionally, when transmitting the full duplex CSI report, UE 115-*c* may transmit an indication that the uplink bandwidth information reports one or more of an uplink pathloss metric, an uplink power headroom metric, a self-interference cancellation ratio, a non-full duplex CSI, a power of self-interference metric, an uplink bandwidth threshold, or a combination thereof. In some cases, the power of self-interference metric may be as reported when an uplink bandwidth does not exceed an uplink bandwidth threshold.

At 430, base station 105-*d* may determine a radio resource allocation, a downlink transport format for downlink data transfer, and an uplink transport format for uplink data transfer based on the full duplex CSI report. In some cases, base station 105-*d* may estimate the full duplex CSI for UE 115-*c* based on the CSI report. Additionally or alternatively, base station 105-*d* may estimate the full duplex CSI for UE 115-*c* based on a pathloss metric, an uplink transmission power headroom metric, a self-interference cancellation ratio, a non-full duplex CSI, or any combination thereof, indicated in the full duplex CSI report. In some cases, base station 105-*d* may estimate the full duplex CSI for UE 115-*c* based on a self-interference metric, an uplink bandwidth threshold, and a non-full duplex CSI indicated in the full duplex CSI report. Accordingly, the radio resource allocation, the downlink transport format for downlink data transfer, and the uplink transport format for uplink data transfer may be determined based on the estimated full duplex CSI.

At 435, UE 115-*c* may receive, from base station 105-*d*, an uplink grant and a downlink grant based on the full duplex CSI report. In some cases, base station 105-*d* may transmit the uplink grant and the downlink grant based on the radio resource allocation, the downlink transport format, and the uplink transport format.

At 440, UE 115-*c* may enter a full duplex mode. Accordingly, at 445 and 450, UE 115-*c* may simultaneously transmit an uplink data transmission based on the uplink grant and receive a downlink data transmission based on the downlink grant.

Figure 5:
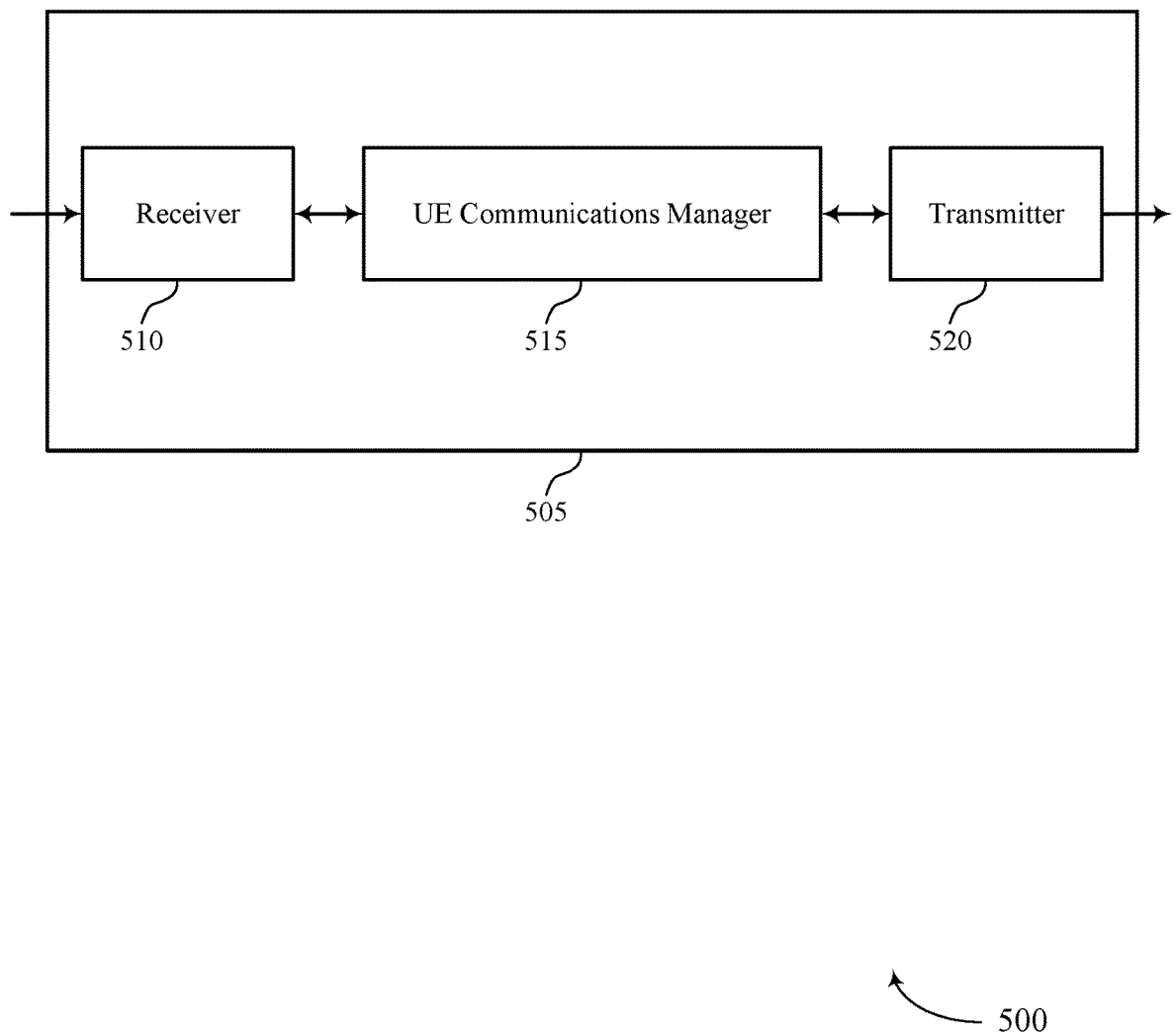
FIGS. 5 and 6 show block diagrams of devices that support CSI report related to uplink transmission bandwidth by full duplex-capable UE in accordance with aspects of the present disclosure.

FIG. 5 shows a block diagram 500 of a device 505 that supports CSI report related to uplink transmission bandwidth by full duplex-capable UE in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to CSI report related to uplink transmission bandwidth by full duplex-capable UE, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may transmit capability signaling that indicates support for a full duplex mode in which the UE is capable of simultaneously transmitting and receiving with a serving base station using a same time-frequency resource. In some cases, the UE communications manager 515 may receive a CSI reporting configuration for full duplex CSI reporting (e.g., based on the capability signaling). Additionally, the UE communications manager 515 may monitor for a CSI reference signal based on the CSI reporting configuration. In some cases, the UE communications manager 515 may transmit a full duplex CSI report that includes uplink bandwidth information based on the monitoring. The UE communications manager 515 may be an example of aspects of the UE communications manager 810 described herein.

Based on the actions performed by the UE communications manager 615 as described herein, a UE 115 may increase the reliability and throughput of a self-full duplex mode data transfer (e.g., subsequent full duplex communications). For example, by transmitting the full duplex CSI report according to a CSI reporting configuration signaled by a base station 105, the base station 105 may identify configuration parameters for the subsequent full duplex communications based on the full duplex CSI report, thereby reducing the impact of self-interference from the UE 115. Accordingly, uplink and downlink traffic have a higher chance of being transmitted successfully with the reduced self-interference that comes as a result of the full duplex CSI report.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
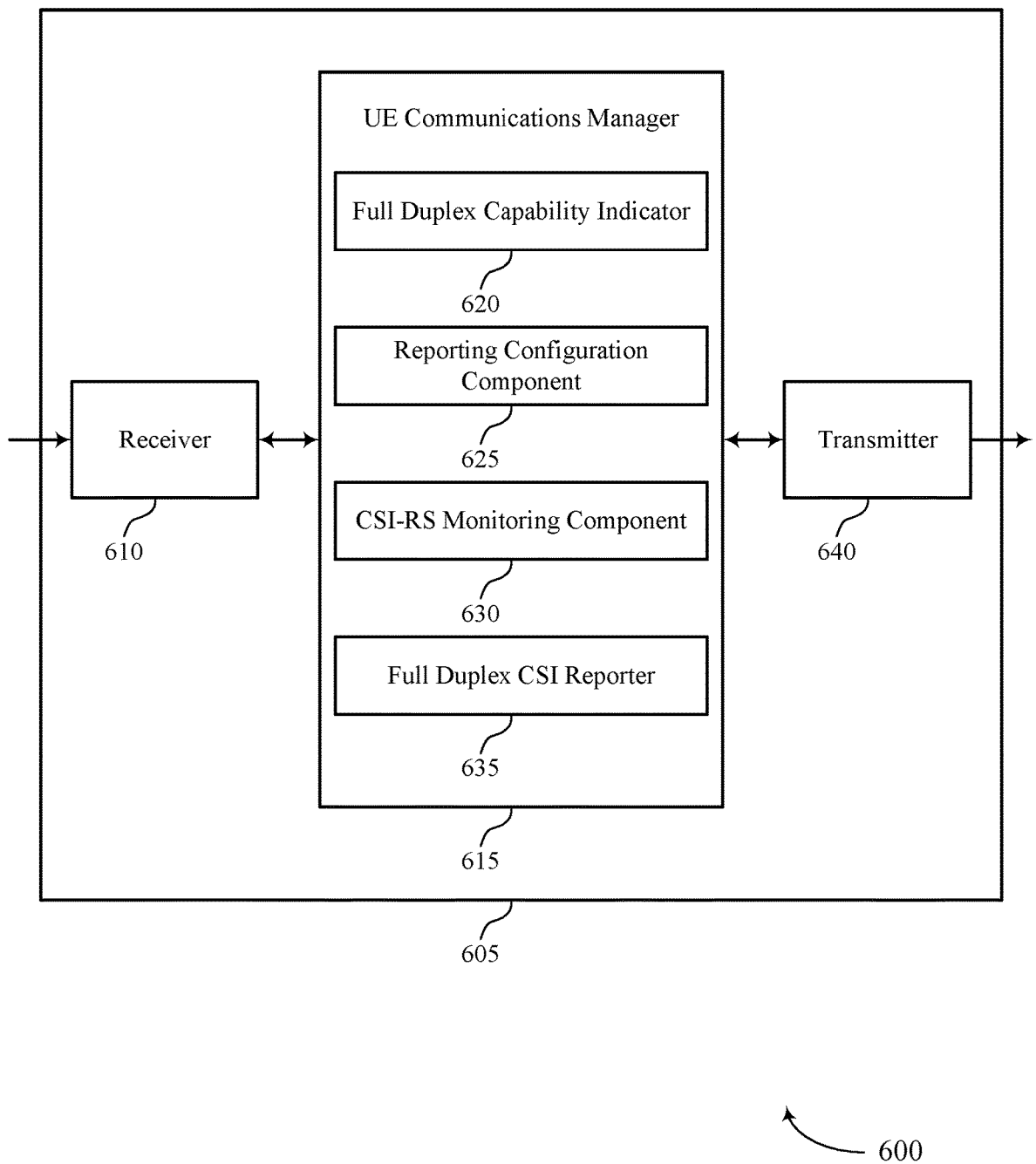

FIG. 6 shows a block diagram 600 of a device 605 that supports CSI report related to uplink transmission bandwidth by full duplex-capable UE in accordance with aspects of the present disclosure. The device 605 may be an example of aspects of a device 505, or a UE 115 as described herein. The device 605 may include a receiver 610, a UE communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to CSI report related to uplink transmission bandwidth by full duplex-capable UE, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a full duplex capability indicator 620, a reporting configuration component 625, a CSI-RS monitoring component 630, and a full duplex CSI reporter 635. The UE communications manager 615 may be an example of aspects of the UE communications manager 810 described herein.

The full duplex capability indicator 620 may transmit capability signaling that indicates support for a full duplex mode in which the UE is capable of simultaneously transmitting and receiving with a serving base station using a same time-frequency resource.

The reporting configuration component 625 may receive a CSI reporting configuration for full duplex CSI reporting (e.g., based on the capability signaling).

The CSI-RS monitoring component 630 may monitor for a CSI reference signal based on the CSI reporting configuration.

The full duplex CSI reporter 635 may transmit a full duplex CSI report that includes uplink bandwidth information based on the monitoring.

Based on transmit a full duplex CSI report that includes uplink bandwidth information, a processor of a UE 115 (e.g., controlling the receiver 710, the transmitter 740, or a transceiver 920 as described with reference to FIG. 9) may reduce power consumption at the UE 115 by reducing the chances of retransmissions for any uplink or downlink transmissions according to the full duplex mode of the UE 115. For example, by using information in the full duplex CSI report (e.g., including the uplink bandwidth information), the processor of the UE 115 may supply more helpful information to enable a base station 105 to schedule any subsequent full duplex communications (e.g., both uplink and downlink traffic) such that any self-interference from the UE 115 is mitigated (e.g., by using a larger uplink transmission bandwidth, a lower uplink transmit power, etc.). Accordingly, the more reliable scheduling may increase the chances that the uplink and downlink traffic are successfully transmitted and received a first time without the need for retransmissions, which may reduce power consumption at various components in the UE 115 (e.g., the processor may not need to prepare extra retransmissions, the receiver 710 may not need to receive extra retransmissions, the transmitter 740 may not need to transmit extra retransmissions, etc.).

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
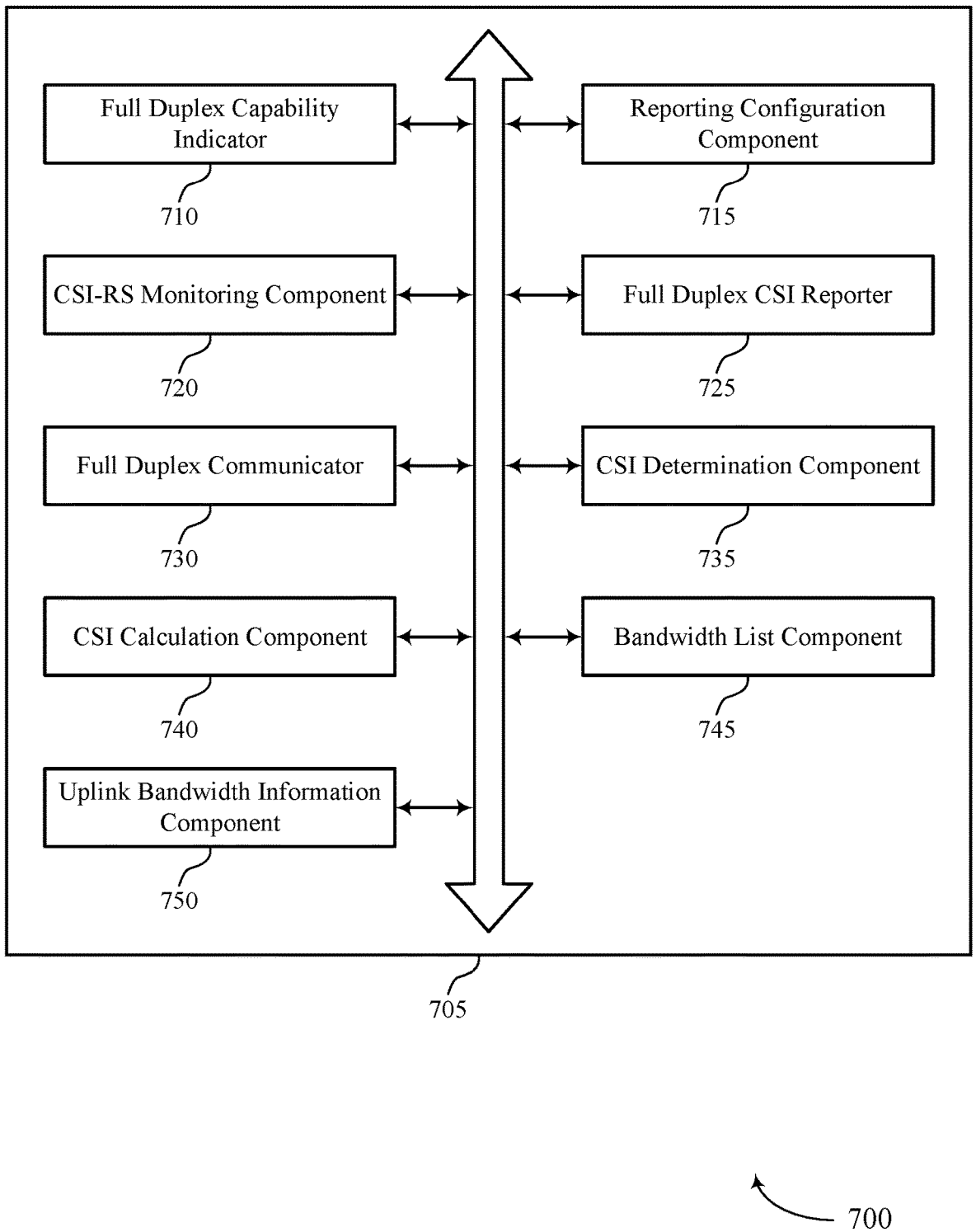
FIG. 7 shows a block diagram of a UE communications manager that supports CSI report related to uplink transmission bandwidth by full duplex-capable UE in accordance with aspects of the present disclosure.

FIG. 7 shows a block diagram 700 of a UE communications manager 705 that supports CSI report related to uplink transmission bandwidth by full duplex-capable UE in accordance with aspects of the present disclosure. The UE communications manager 705 may be an example of aspects of a UE communications manager 515, a UE communications manager 615, or a UE communications manager 810 described herein. The UE communications manager 705 may include a full duplex capability indicator 710, a reporting configuration component 715, a CSI-RS monitoring component 720, a full duplex CSI reporter 725, a full duplex communicator 730, a CSI determination component 735, a CSI calculation component 740, a bandwidth list component 745, and an uplink bandwidth information component 750. Each of these modules may communicate, directly or indirectly, with one another (e.g., via one or more buses).

The full duplex capability indicator 710 may transmit capability signaling that indicates support for a full duplex mode in which the UE is capable of simultaneously transmitting and receiving with a serving base station using a same time-frequency resource.

The reporting configuration component 715 may receive a CSI reporting configuration for full duplex CSI reporting (e.g., based on the capability signaling). In some examples, the reporting configuration component 715 may receive the CSI reporting configuration that indicates an uplink bandwidth, where the uplink bandwidth information indicates CSI for the uplink bandwidth. Additionally or alternatively, the reporting configuration component 715 may receive the CSI reporting configuration that indicates a number of PRBs or subbands as the uplink bandwidth. In some examples, the reporting configuration component 715 may receive the CSI reporting configuration that indicates at least one uplink bandwidth value, where the full duplex CSI report reports a CSI value for each uplink bandwidth value of the at least one uplink bandwidth value. In some cases, the reporting configuration component 715 may receive RRC signaling including the CSI reporting configuration, a MAC CE including the CSI reporting configuration, DCI including the CSI reporting configuration, or any combination thereof.

The CSI-RS monitoring component 720 may monitor for a CSI reference signal based on the CSI reporting configuration.

The full duplex CSI reporter 725 may transmit a full duplex CSI report that includes uplink bandwidth information based on the monitoring. In some examples, the full duplex CSI reporter 725 may transmit a full duplex CSI report that includes the uplink bandwidth information that indicates CSI for a set of different uplink bandwidths. In some examples, the full duplex CSI reporter 725 may transmit the full duplex CSI report that indicates a single CSI and a single uplink bandwidth threshold. Accordingly, the single CSI may be valid when uplink bandwidth does not exceed the uplink bandwidth threshold.

The full duplex communicator 730 may receive an uplink grant and a downlink grant based on the full duplex CSI report. In some examples, the full duplex communicator 730 may simultaneously transmit an uplink data transmission based on the uplink grant and receiving a downlink data transmission based on the downlink grant.

The CSI determination component 735 may receive the CSI reporting configuration that indicates an uplink transmission power when measuring a downlink channel status, where the full duplex CSI report indicates full duplex CSI determined based on the uplink transmission power. In some examples, the CSI determination component 735 may receive the CSI reporting configuration that indicates an uplink multi-antenna scheme when measuring a downlink channel status, where the full duplex CSI report indicates full duplex CSI determined based on the uplink multi-antenna scheme. Additionally or alternatively, the CSI determination component 735 may receive the CSI reporting configuration that indicates a CSI reference signal repetition scheme, where the full duplex CSI report indicates full duplex CSI determined based on the CSI reference signal repetition scheme. In some examples, the CSI reporting configuration may include a flag indicating whether to report CSI for a full duplex mode, a non-full duplex mode, or both, and the CSI determination component 735 may generate the full duplex CSI report based on the flag. In some examples, the CSI determination component 735 may determine whether to report CSI for the full duplex mode based on a spectrum efficiency threshold.

The CSI calculation component 740 may calculate full duplex CSI based on the CSI reporting configuration and the monitoring, where the full duplex CSI report indicates the calculated full duplex CSI. In some examples, the CSI calculation component 740 may measure a downlink channel status based on a first number of transmit antennas and a second number of receive antennas of the UE, determine a self-interference metric using the first number of transmit antennas and the second number of receive antennas, and calculate full duplex CSI based on the downlink channel status and the self-interference metric, where the full duplex CSI report indicates the calculated full duplex CSI. Additionally or alternatively, the CSI calculation component 740 may measure a downlink channel status for an uplink transmission at one or more resource elements on the CSI reference signal and may calculate full duplex CSI based on the downlink channel status and a transmission type of the uplink transmission, where the full duplex CSI report indicates the calculated full duplex CSI. In some examples, the CSI calculation component 740 may receive the CSI reporting configuration that indicates the uplink transmission type utilizes a first uplink transmission power of a set of different uplink transmission powers, a first uplink multiple antenna scheme of a set of different multiple antenna schemes, or both.

The bandwidth list component 745 may transmit the full duplex CSI report that indicates a set of CSIs, each CSI of the set of CSIs corresponding to a respective uplink bandwidth value from a list of bandwidth values. In some examples, the bandwidth list component 745 may transmit the full duplex CSI report that indicates that a respective CSI of the set of CSIs corresponds to a respective uplink bandwidth value from a list of bandwidth values. In some cases, the list of bandwidth values may be a list of numbers of physical resource blocks, subbands, or both. Additionally or alternatively, the full duplex CSI report may include a number of CSIs that is fewer than a number of uplink bandwidth value in the list of bandwidth values. Accordingly, the bandwidth list component 745 may select a subset of uplink bandwidth values from the list of bandwidth values on which to report CSI based on a priority order.

The uplink bandwidth information component 750 may transmit the full duplex CSI report that indicates the uplink bandwidth information that reports one or more of an uplink pathloss metric, an uplink power headroom metric, a self-interference cancellation ratio, or any combination thereof. In some examples, the uplink bandwidth information component 750 may transmit the full duplex CSI report that indicates the uplink bandwidth information that reports a self-interference cancellation ratio, a non-full duplex CSI, and one of an uplink pathloss metric or an uplink power headroom metric. Additionally or alternatively, the uplink bandwidth information component 750 may transmit the full duplex CSI report that indicates the uplink bandwidth information that reports a power of self-interference metric, an uplink bandwidth threshold, and a non-full duplex CSI. In some cases, the power of self-interference metric may be as reported when uplink bandwidth does not exceed the uplink bandwidth threshold.

Figure 8:
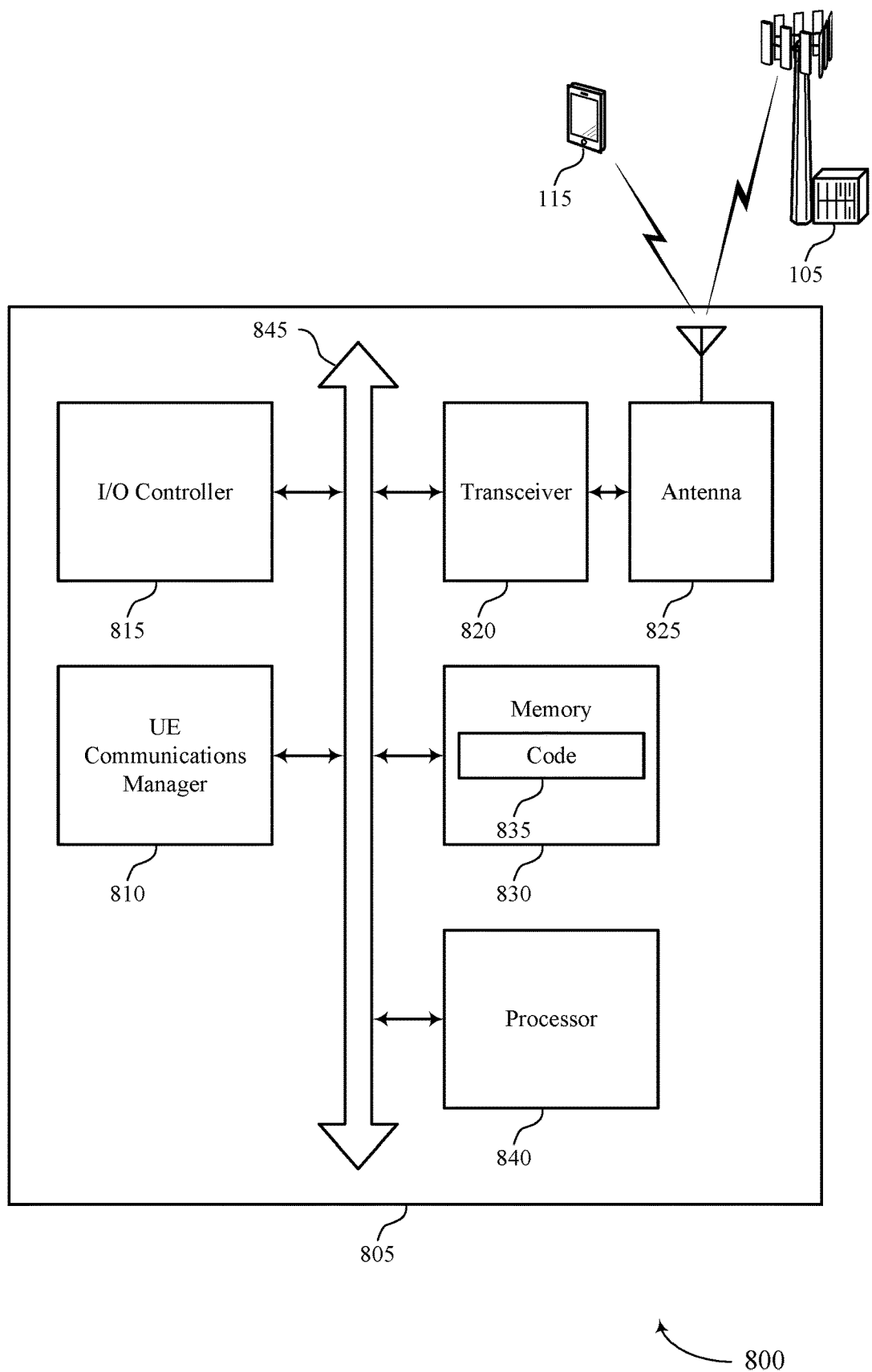
FIG. 8 shows a diagram of a system including a device that supports CSI report related to uplink transmission bandwidth by full duplex-capable UE in accordance with aspects of the present disclosure.

FIG. 8 shows a diagram of a system 800 including a device 805 that supports CSI report related to uplink transmission bandwidth by full duplex-capable UE in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may transmit capability signaling that indicates support for a full duplex mode in which the UE is capable of simultaneously transmitting and receiving with a serving base station using a same time-frequency resource. In some cases, the UE communications manager 810 may receive a CSI reporting configuration for full duplex CSI reporting (e.g., based on the capability signaling). Additionally, the UE communications manager 810 may monitor for a CSI reference signal based on the CSI reporting configuration. In some cases, the UE communications manager 810 may transmit a full duplex CSI report that includes uplink bandwidth information based on the monitoring.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting CSI report related to uplink transmission bandwidth by full duplex-capable UE).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
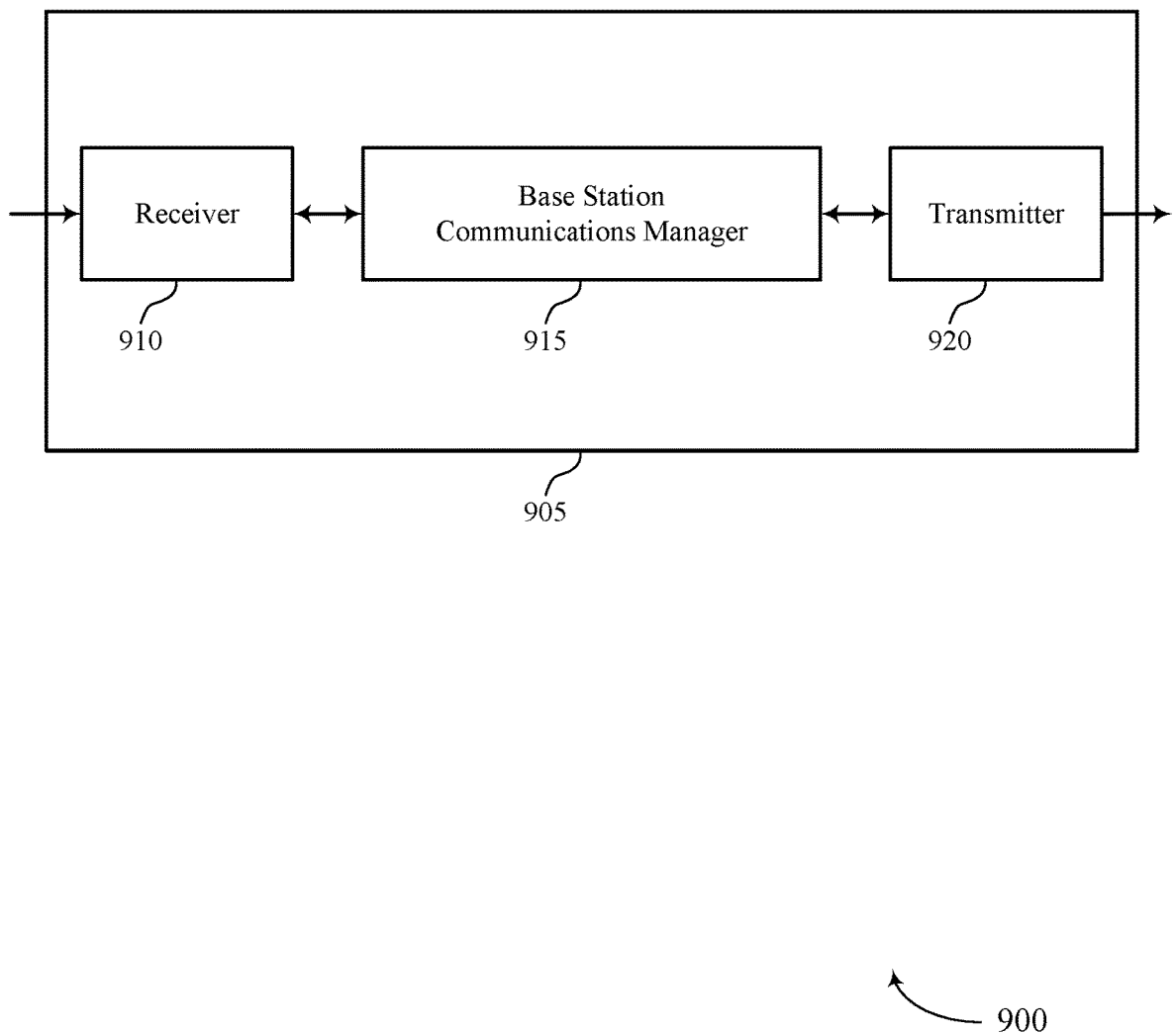
FIGS. 9 and 10 show block diagrams of devices that support CSI report related to uplink transmission bandwidth by full duplex-capable UE in accordance with aspects of the present disclosure.

FIG. 9 shows a block diagram 900 of a device 905 that supports CSI report related to uplink transmission bandwidth by full duplex-capable UE in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to CSI report related to uplink transmission bandwidth by full duplex-capable UE, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may receive, from a UE, capability signaling that indicates support for a full duplex mode in which the UE is capable is simultaneously transmitting and receiving with a serving base station using a same time-frequency resource. In some cases, the base station communications manager 915 may transmit a CSI reporting configuration for full duplex CSI reporting (e.g., based on the capability signaling). Additionally, the base station communications manager 915 may transmit a CSI reference signal based on the CSI reporting configuration. In some cases, the base station communications manager 915 may receive a full duplex CSI report that includes uplink bandwidth information based on the transmitting the CSI reference signal. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
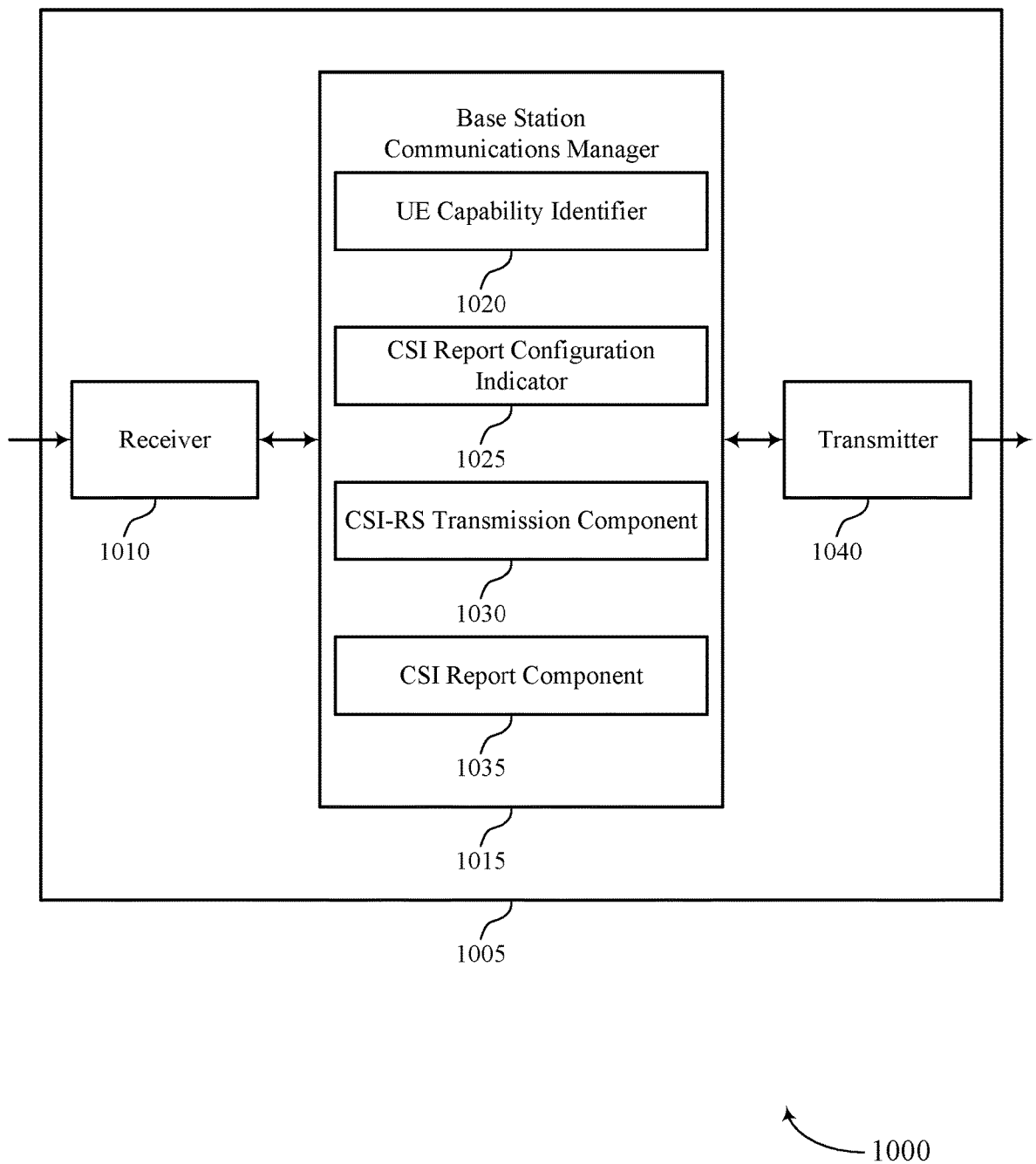

FIG. 10 shows a block diagram 1000 of a device 1005 that supports CSI report related to uplink transmission bandwidth by full duplex-capable UE in accordance with aspects of the present disclosure. The device 1005 may be an example of aspects of a device 905, or a base station 105 as described herein. The device 1005 may include a receiver 1010, a base station communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to CSI report related to uplink transmission bandwidth by full duplex-capable UE, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include an UE capability identifier 1020, a CSI report configuration indicator 1025, a CSI-RS transmission component 1030, and a CSI report component 1035. The base station communications manager 1015 may be an example of aspects of the base station communications manager 1210 described herein.

The UE capability identifier 1020 may receive, from a UE, capability signaling that indicates support for a full duplex mode in which the UE is capable is simultaneously transmitting and receiving with a serving base station using a same time-frequency resource.

The CSI report configuration indicator 1025 may transmit a CSI reporting configuration for full duplex CSI reporting (e.g., based on the capability signaling).

The CSI-RS transmission component 1030 may transmit a CSI reference signal based on the CSI reporting configuration.

The CSI report component 1035 may receive a full duplex CSI report that includes uplink bandwidth information based on the transmitting the CSI reference signal.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
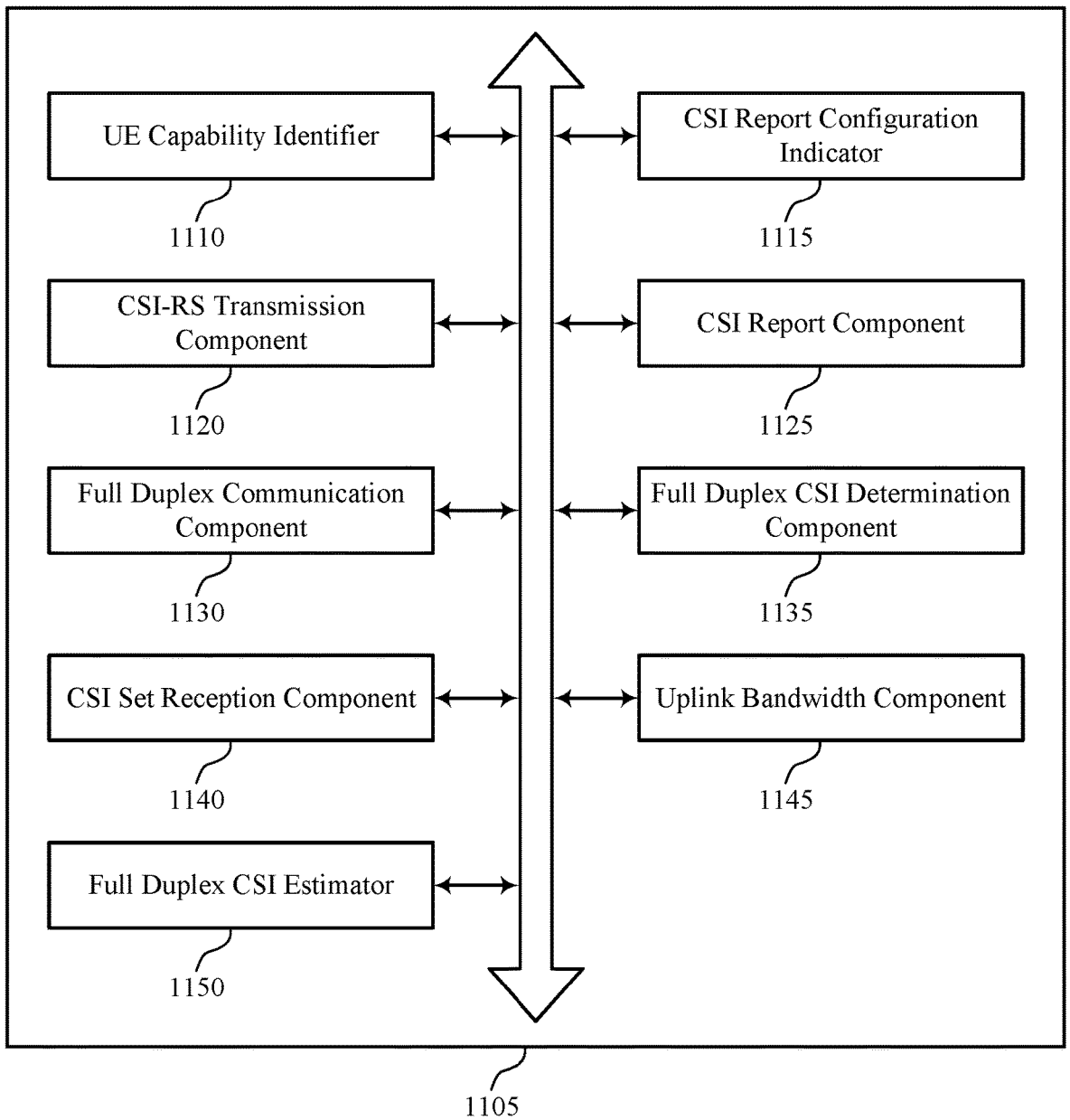
FIG. 11 shows a block diagram of a base station communications manager that supports CSI report related to uplink transmission bandwidth by full duplex-capable UE in accordance with aspects of the present disclosure.

FIG. 11 shows a block diagram 1100 of a base station communications manager 1105 that supports CSI report related to uplink transmission bandwidth by full duplex-capable UE in accordance with aspects of the present disclosure. The base station communications manager 1105 may be an example of aspects of a base station communications manager 915, a base station communications manager 1015, or a base station communications manager 1210 described herein. The base station communications manager 1105 may include an UE capability identifier 1110, a CSI report configuration indicator 1115, a CSI-RS transmission component 1120, a CSI report component 1125, a full duplex communication component 1130, a full duplex CSI determination component 1135, a CSI set reception component 1140, an uplink bandwidth component 1145, and a full duplex CSI estimator 1150. Each of these modules may communicate, directly or indirectly, with one another (e.g., via one or more buses).

The UE capability identifier 1110 may receive, from a UE, capability signaling that indicates support for a full duplex mode in which the UE is capable is simultaneously transmitting and receiving with a serving base station using a same time-frequency resource. In some examples, the UE capability identifier 1110 may receive a full duplex CSI report that includes the uplink bandwidth information that indicates CSI for a set of different uplink bandwidths.

The CSI report configuration indicator 1115 may transmit a CSI reporting configuration for full duplex CSI reporting (e.g., based on the capability signaling). In some examples, the CSI report configuration indicator 1115 may transmit the CSI reporting configuration that indicates an uplink bandwidth, where the uplink bandwidth information indicates CSI for the uplink bandwidth. Additionally or alternatively, the CSI report configuration indicator 1115 may transmit the CSI reporting configuration that indicates a number of PRBs or subbands as the uplink bandwidth. In some examples, the CSI report configuration indicator 1115 may transmit the CSI reporting configuration that indicates at least one uplink bandwidth value, where the full duplex CSI report reports a CSI value for each uplink bandwidth value of the at least one uplink bandwidth value. In some cases, the CSI report configuration indicator 1115 may transmit RRC signaling including the CSI reporting configuration, a MAC CE including the CSI reporting configuration, DCI including the CSI reporting configuration, or any combination thereof.

The CSI-RS transmission component 1120 may transmit a CSI reference signal based on the CSI reporting configuration.

The CSI report component 1125 may receive a full duplex CSI report that includes uplink bandwidth information based on the transmitting the CSI reference signal. In some examples, the CSI report component 1125 may receive the full duplex CSI report that indicates a single CSI and a single uplink bandwidth threshold. In some examples, the CSI reporting configuration may include a flag indicating whether to report CSI for a full duplex mode, a non-full-duplex, or both, and the CSI report component 1125 may generate the full duplex CSI report based on the flag. In some examples, the CSI report component 1125 may determine whether to report CSI for the full duplex mode based on a spectrum efficiency threshold. Accordingly, the single CSI may be valid when uplink bandwidth does not exceed the uplink bandwidth threshold.

The full duplex communication component 1130 may transmit an uplink grant and a downlink grant based on the full duplex CSI report. In some examples, the full duplex communication component 1130 may simultaneously receive an uplink data transmission based on the uplink grant and transmitting a downlink data transmission based on the downlink grant.

The full duplex CSI determination component 1135 may transmit the CSI reporting configuration that indicates an uplink transmission power when measuring a downlink channel status, where the full duplex CSI report indicates full duplex CSI determined based on the uplink transmission power. In some examples, the full duplex CSI determination component 1135 may transmit the CSI reporting configuration that indicates an uplink multi-antenna scheme when measuring a downlink channel status, where the full duplex CSI report indicates full duplex CSI determined based on the uplink multi-antenna scheme. Additionally or alternatively, the full duplex CSI determination component 1135 may transmit the CSI reporting configuration that indicates a CSI reference signal repetition scheme, where the full duplex CSI report indicates full duplex CSI determined based on the CSI reference signal repetition scheme. In some examples, the full duplex CSI determination component 1135 may transmit the CSI reporting configuration that indicates an uplink transmission type utilizes a first uplink transmission power of a set of different uplink transmission powers, a first uplink multiple antenna scheme of a set of different multiple antenna schemes, or both.

The CSI set reception component 1140 may receive the full duplex CSI report that indicates a set of CSIs, each CSI of the set of CSIs corresponding to a respective uplink bandwidth value from a list of bandwidth values. In some examples, the CSI set reception component 1140 may receive the full duplex CSI report that indicates that a respective CSI of the set of CSIs corresponds to a respective uplink bandwidth value from a list of bandwidth values. Additionally, the CSI set reception component 1140 may determine that the full duplex CSI report includes CSI for a subset of uplink bandwidth values from the list of bandwidth values based on a priority order. In some cases, the list of bandwidth values may be a list of numbers of PRBs, subbands, or both. In some cases, the full duplex CSI report may include a number of CSIs that is fewer than a number of uplink bandwidth value in the list of bandwidth values.

The uplink bandwidth component 1145 may receive the full duplex CSI report that indicates the uplink bandwidth information that reports one or more of an uplink pathloss metric, an uplink power headroom metric, a self-interference cancellation ratio, or any combination thereof. In some examples, the uplink bandwidth component 1145 may receive the full duplex CSI report that indicates the uplink bandwidth information that reports a self-interference cancellation ratio, a non-full duplex CSI, and one of an uplink pathloss metric or an uplink power headroom metric. Additionally or alternatively, the uplink bandwidth component 1145 may receive the full duplex CSI report that indicates the uplink bandwidth information that reports a power of self-interference metric, an uplink bandwidth threshold, and a non-full duplex CSI. In some cases, the power of self-interference metric may be as reported when uplink bandwidth does not exceed the uplink bandwidth threshold.

Figure 12:
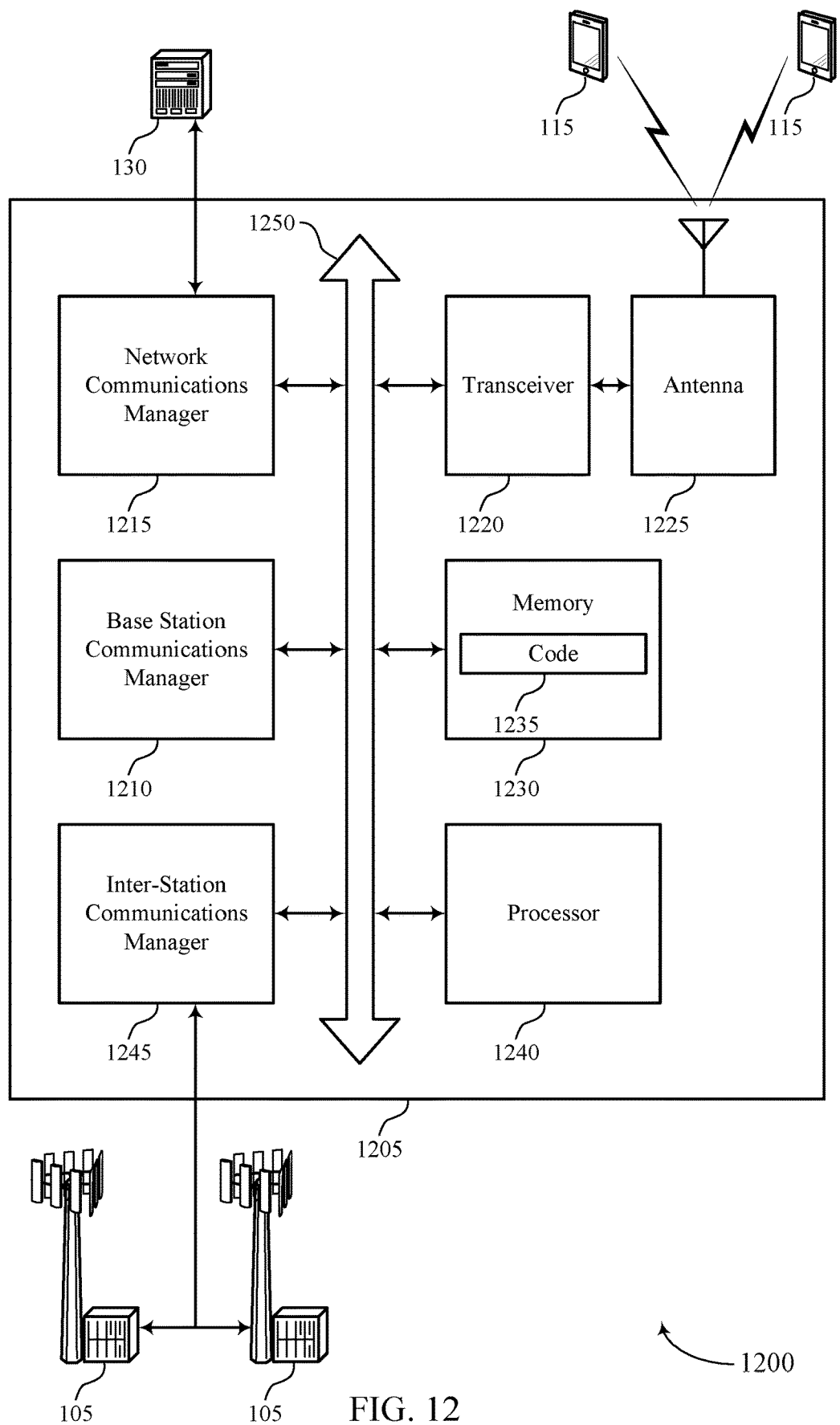
FIG. 12 shows a diagram of a system including a device that supports CSI report related to uplink transmission bandwidth by full duplex-capable UE in accordance with aspects of the present disclosure.

The full duplex CSI estimator 1150 may determine a radio resource allocation, a downlink transport format for downlink data transfer, and an uplink transport format for uplink data transfer based on the full duplex CSI report and transmit an uplink grant and a downlink grant based on the radio resource allocation, the downlink transport format, and the uplink transport format. Additionally, the full duplex CSI estimator 1150 may estimate the full duplex CSI for the UE based on the CSI report. In some examples, the full duplex CSI estimator 1150 may estimate the full duplex CSI for the UE based on a pathloss metric, an uplink transmission power headroom metric, a self-interference cancellation ratio, a non-full duplex CSI, or any combination thereof, indicated in the full duplex CSI report. Additionally or alternatively, the full duplex CSI estimator 1150 may estimate the full duplex CSI for the UE based on a self-interference metric, an uplink bandwidth threshold, and a non-full duplex CSI indicated in the full duplex CSI report. Accordingly, the radio resource allocation, the downlink transport format for downlink data transfer, and the uplink transport format for uplink data transfer may be determined based on the estimated full duplex CSI FIG. 12 shows a diagram of a system 1200 including a device 1205 that supports CSI report related to uplink transmission bandwidth by full duplex-capable UE in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may receive, from a UE, capability signaling that indicates support for a full duplex mode in which the UE is capable is simultaneously transmitting and receiving with a serving base station using a same time-frequency resource. In some cases, the base station communications manager 1210 may transmit a CSI reporting configuration for full duplex CSI reporting (e.g., based on the capability signaling). Additionally, the base station communications manager 1210 may transmit a CSI reference signal based on the CSI reporting configuration. In some cases, The base station communications manager 1210 may receive a full duplex CSI report that includes uplink bandwidth information based on the transmitting the CSI reference signal.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting CSI report related to uplink transmission bandwidth by full duplex-capable UE).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
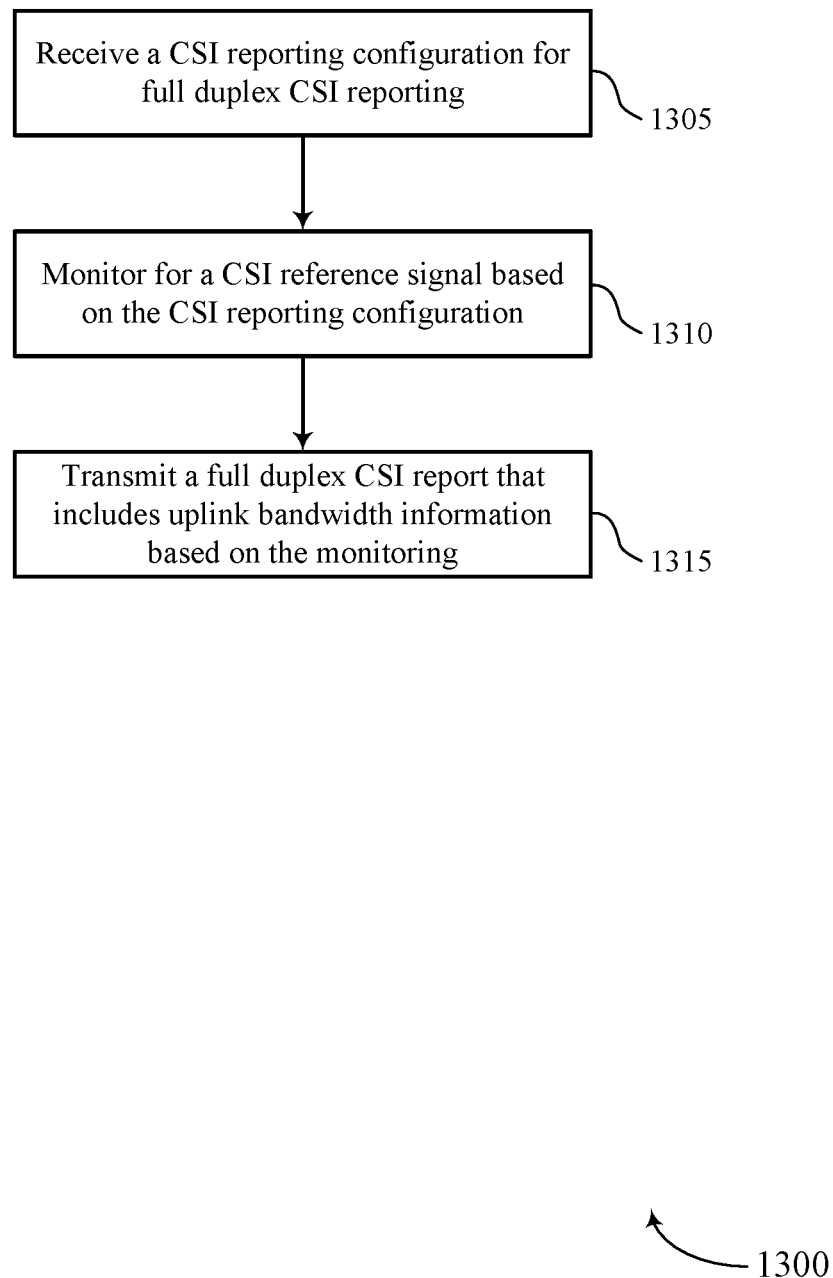
FIGS. 13 through 18 show flowcharts illustrating methods that support CSI report related to uplink transmission bandwidth by full duplex-capable UE in accordance with aspects of the present disclosure.

FIG. 13 shows a flowchart illustrating a method 1300 that supports CSI report related to uplink transmission bandwidth by full duplex-capable UE in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a CSI reporting configuration for full duplex CSI reporting. The operations of 1305 may be performed according to the methods described herein. In some examples, aspects of the operations of 1305 may be performed by a reporting configuration component as described with reference to FIGS. 5 through 8.

At 1310, the UE may monitor for a CSI reference signal based on the CSI reporting configuration. The operations of 1310 may be performed according to the methods described herein. In some examples, aspects of the operations of 1310 may be performed by a CSI-RS monitoring component as described with reference to FIGS. 5 through 8.

At 1315, the UE may transmit a full duplex CSI report that includes uplink bandwidth information based on the monitoring. The operations of 1315 may be performed according to the methods described herein. In some examples, aspects of the operations of 1315 may be performed by a full duplex CSI reporter as described with reference to FIGS. 5 through 8.

Figure 14:
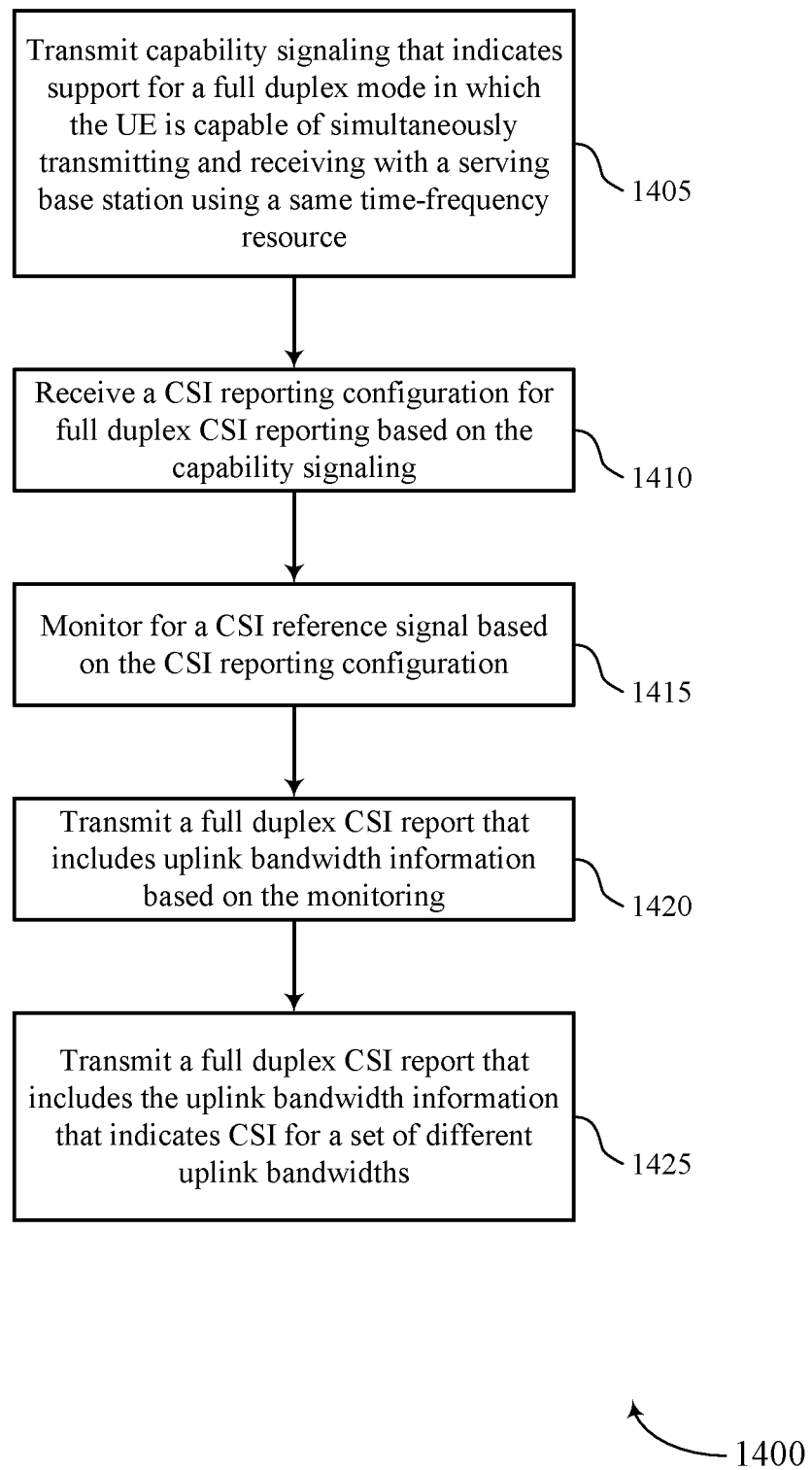

FIG. 14 shows a flowchart illustrating a method 1400 that supports CSI report related to uplink transmission bandwidth by full duplex-capable UE in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit capability signaling that indicates support for a full duplex mode in which the UE is capable of simultaneously transmitting and receiving with a serving base station using a same time-frequency resource. The operations of 1405 may be performed according to the methods described herein. In some examples, aspects of the operations of 1405 may be performed by a full duplex capability indicator as described with reference to FIGS. 5 through 8.

At 1410, the UE may receive a CSI reporting configuration for full duplex CSI reporting based on the capability signaling. The operations of 1410 may be performed according to the methods described herein. In some examples, aspects of the operations of 1410 may be performed by a reporting configuration component as described with reference to FIGS. 5 through 8.

At 1415, the UE may monitor for a CSI reference signal based on the CSI reporting configuration. The operations of 1415 may be performed according to the methods described herein. In some examples, aspects of the operations of 1415 may be performed by a CSI-RS monitoring component as described with reference to FIGS. 5 through 8.

At 1420, the UE may transmit a full duplex CSI report that includes uplink bandwidth information based on the monitoring. The operations of 1420 may be performed according to the methods described herein. In some examples, aspects of the operations of 1420 may be performed by a full duplex CSI reporter as described with reference to FIGS. 5 through 8.

At 1425, the UE may transmit a full duplex CSI report that includes the uplink bandwidth information that indicates channel state information for a set of different uplink bandwidths. The operations of 1425 may be performed according to the methods described herein. In some examples, aspects of the operations of 1425 may be performed by a full duplex CSI reporter as described with reference to FIGS. 5 through 8.

Figure 15:
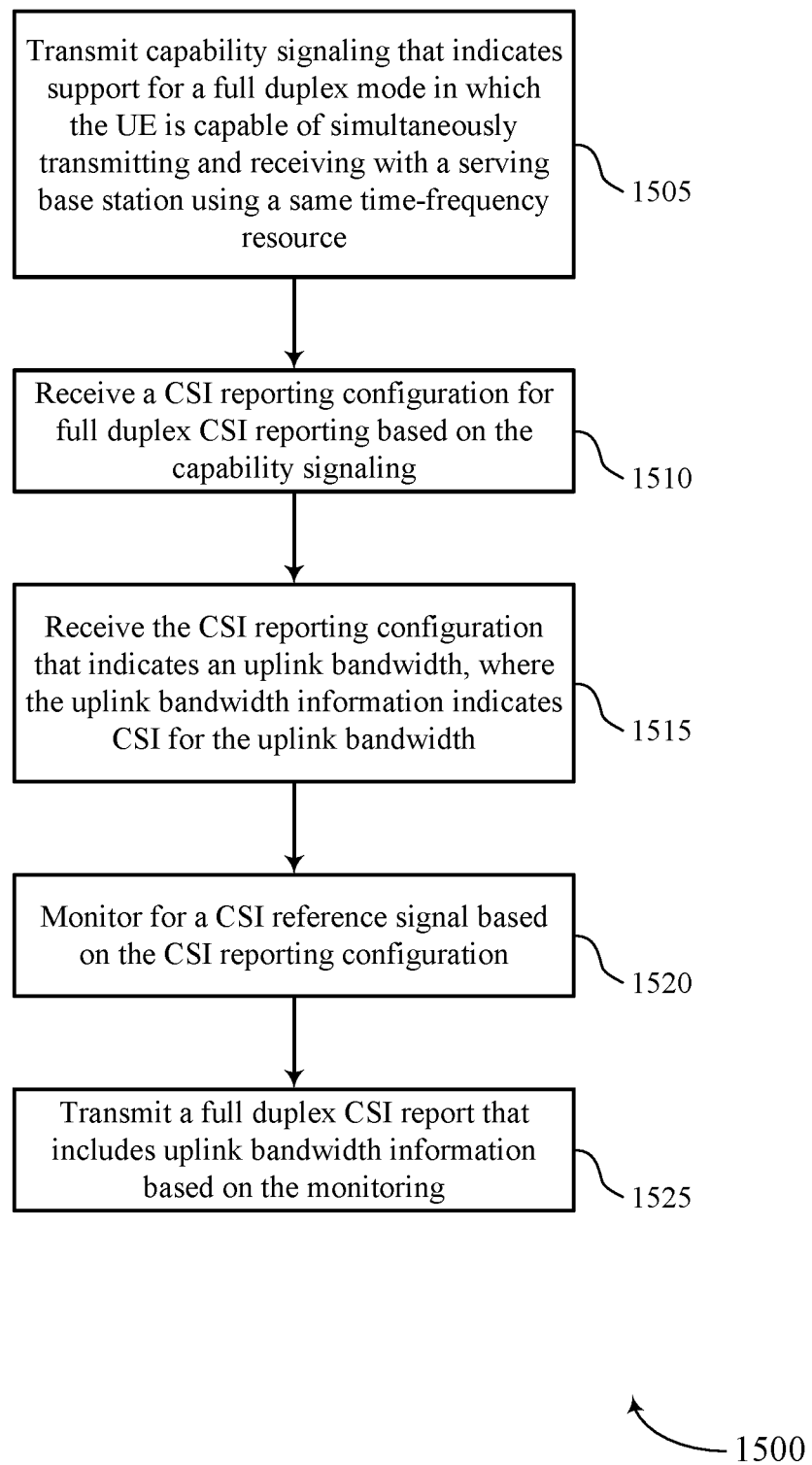

FIG. 15 shows a flowchart illustrating a method 1500 that supports CSI report related to uplink transmission bandwidth by full duplex-capable UE in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit capability signaling that indicates support for a full duplex mode in which the UE is capable of simultaneously transmitting and receiving with a serving base station using a same time-frequency resource. The operations of 1505 may be performed according to the methods described herein. In some examples, aspects of the operations of 1505 may be performed by a full duplex capability indicator as described with reference to FIGS. 5 through 8.

At 1510, the UE may receive a CSI reporting configuration for full duplex CSI reporting based on the capability signaling. The operations of 1510 may be performed according to the methods described herein. In some examples, aspects of the operations of 1510 may be performed by a reporting configuration component as described with reference to FIGS. 5 through 8.

At 1515, the UE may receive the CSI reporting configuration that indicates an uplink bandwidth, where the uplink bandwidth information indicates CSI for the uplink bandwidth. The operations of 1515 may be performed according to the methods described herein. In some aspects of the operations of 1515 may be performed by a reporting configuration component as described with reference to FIGS. 5 through 8.

At 1520, the UE may monitor for a CSI reference signal based on the CSI reporting configuration. The operations of 1520 may be performed according to the methods described herein. In some examples, aspects of the operations of 1520 may be performed by a CSI-RS monitoring component as described with reference to FIGS. 5 through 8.

At 1525, the UE may transmit a full duplex CSI report that includes uplink bandwidth information based on the monitoring. The operations of 1525 may be performed according to the methods described herein. In some examples, aspects of the operations of 1525 may be performed by a full duplex CSI reporter as described with reference to FIGS. 5 through 8.

Figure 16:
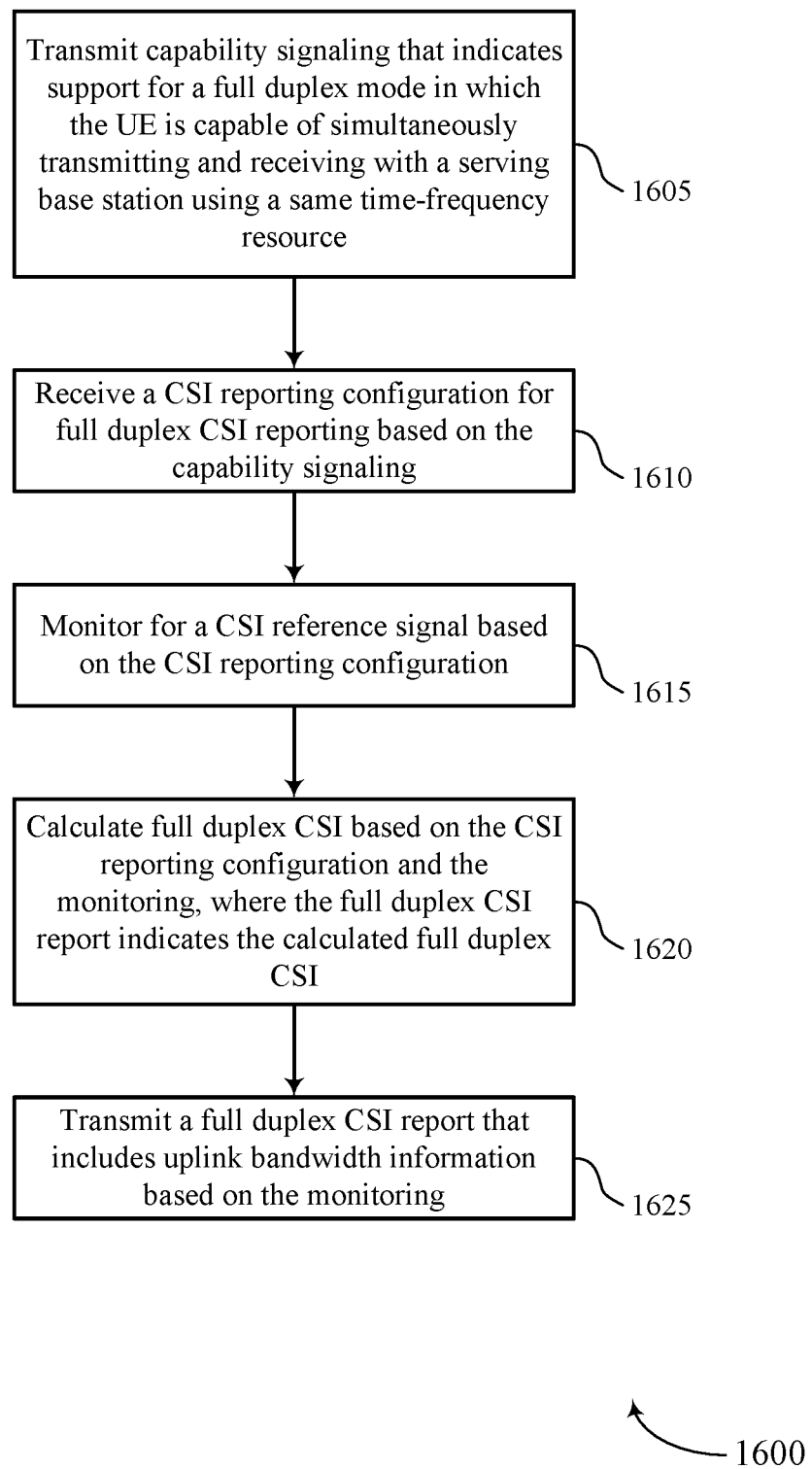

FIG. 16 shows a flowchart illustrating a method 1600 that supports CSI report related to uplink transmission bandwidth by full duplex-capable UE in accordance with aspects of the present disclosure. The operations of method 1600 may be implemented by a UE 115 or its components as described herein. For example, the operations of method 1600 may be performed by a UE communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may transmit capability signaling that indicates support for a full duplex mode in which the UE is capable of simultaneously transmitting and receiving with a serving base station using a same time-frequency resource. The operations of 1605 may be performed according to the methods described herein. In some examples, aspects of the operations of 1605 may be performed by a full duplex capability indicator as described with reference to FIGS. 5 through 8.

At 1610, the UE may receive a CSI reporting configuration for full duplex CSI reporting based on the capability signaling. The operations of 1610 may be performed according to the methods described herein. In some examples, aspects of the operations of 1610 may be performed by a reporting configuration component as described with reference to FIGS. 5 through 8.

At 1615, the UE may monitor for a CSI reference signal based on the CSI reporting configuration. The operations of 1615 may be performed according to the methods described herein. In some examples, aspects of the operations of 1615 may be performed by a CSI-RS monitoring component as described with reference to FIGS. 5 through 8.

At 1620, the UE may calculate full duplex CSI based on the CSI reporting configuration and the monitoring, where the full duplex CSI report indicates the calculated full duplex CSI. The operations of 1620 may be performed according to the methods described herein. In some examples, aspects of the operations of 1620 may be performed by a CSI calculation component as described with reference to FIGS. 5 through 8.

At 1625, the UE may transmit a full duplex CSI report that includes uplink bandwidth information based on the monitoring. The operations of 1625 may be performed according to the methods described herein. In some examples, aspects of the operations of 1625 may be performed by a full duplex CSI reporter as described with reference to FIGS. 5 through 8.

Figure 17:
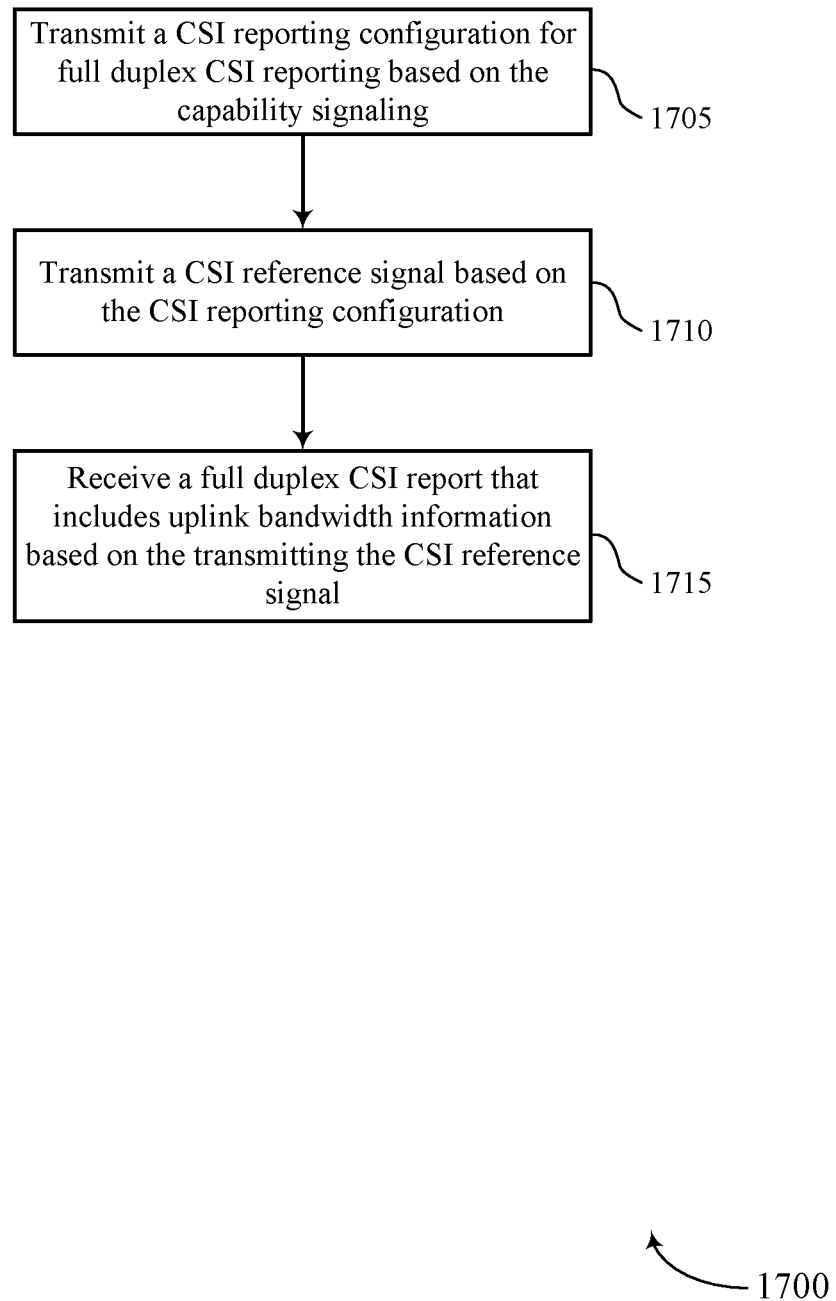

FIG. 17 shows a flowchart illustrating a method 1700 that supports CSI report related to uplink transmission bandwidth by full duplex-capable UE in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit a CSI reporting configuration for full duplex CSI reporting. The operations of 1705 may be performed according to the methods described herein. In some examples, aspects of the operations of 1705 may be performed by a CSI report configuration indicator as described with reference to FIGS. 9 through 12.

At 1710, the base station may transmit a CSI reference signal based on the CSI reporting configuration. The operations of 1710 may be performed according to the methods described herein. In some examples, aspects of the operations of 1710 may be performed by a CSI-RS transmission component as described with reference to FIGS. 9 through 12.

At 1715, the base station may receive a full duplex CSI report that includes uplink bandwidth information based on the transmitting the CSI reference signal. The operations of 1715 may be performed according to the methods described herein. In some examples, aspects of the operations of 1715 may be performed by a CSI report component as described with reference to FIGS. 9 through 12.

Figure 18:
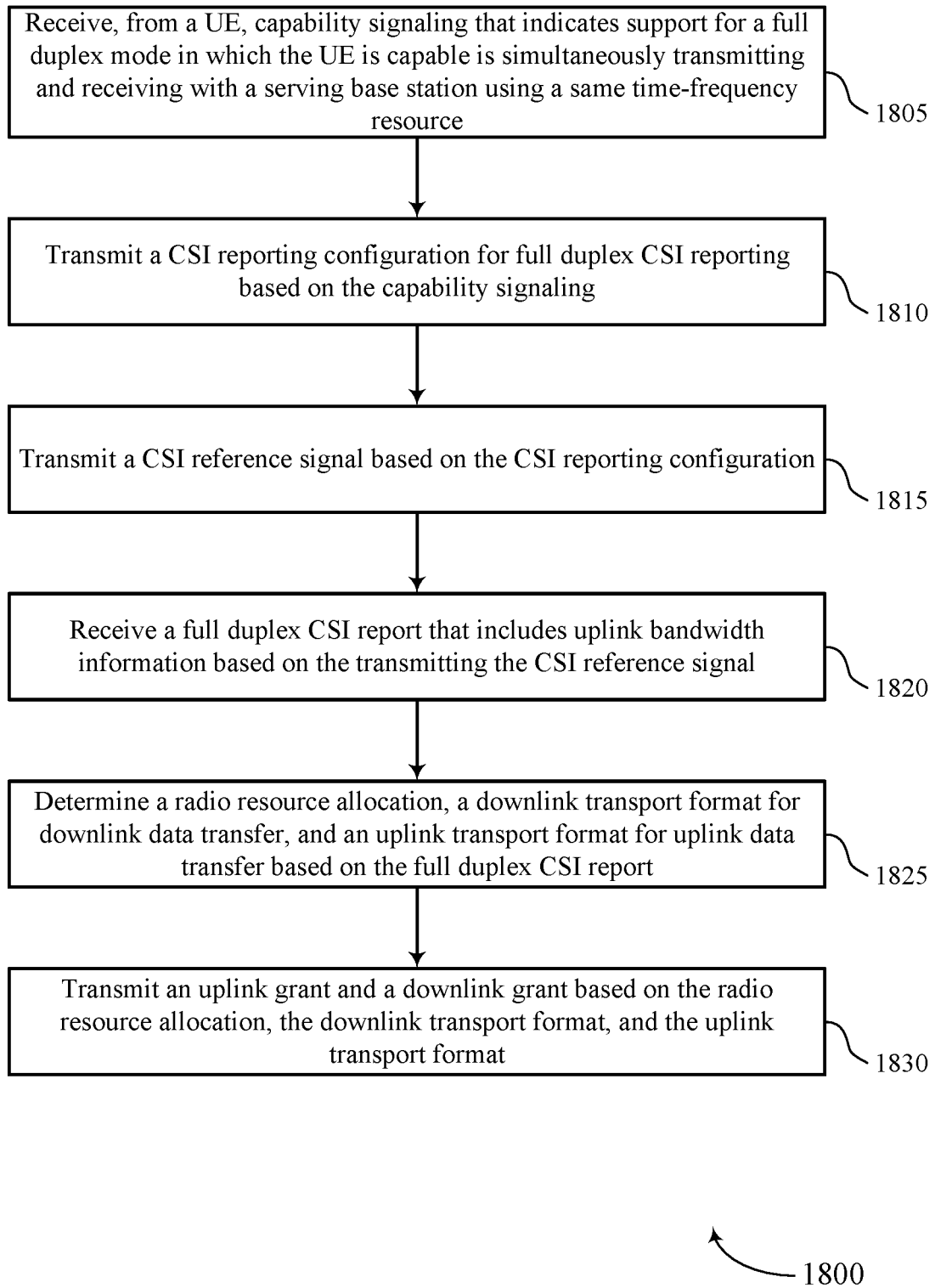

FIG. 18 shows a flowchart illustrating a method 1800 that supports CSI report related to uplink transmission bandwidth by full duplex-capable UE in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE, capability signaling that indicates support for a full duplex mode in which the UE is capable is simultaneously transmitting and receiving with a serving base station using a same time-frequency resource. The operations of 1805 may be performed according to the methods described herein. In some examples, aspects of the operations of 1805 may be performed by a UE capability identifier as described with reference to FIGS. 9 through 12.

At 1810, the base station may transmit a CSI reporting configuration for full duplex CSI reporting based on the capability signaling. The operations of 1810 may be performed according to the methods described herein. In some examples, aspects of the operations of 1810 may be performed by a CSI report configuration indicator as described with reference to FIGS. 9 through 12.

At 1815, the base station may transmit a CSI reference signal based on the CSI reporting configuration. The operations of 1815 may be performed according to the methods described herein. In some examples, aspects of the operations of 1815 may be performed by a CSI-RS transmission component as described with reference to FIGS. 9 through 12.

At 1820, the base station may receive a full duplex CSI report that includes uplink bandwidth information based on the transmitting the CSI reference signal. The operations of 1820 may be performed according to the methods described herein. In some examples, aspects of the operations of 1820 may be performed by a CSI report component as described with reference to FIGS. 9 through 12.

At 1825, the base station may determine a radio resource allocation, a downlink transport format for downlink data transfer, and an uplink transport format for uplink data transfer based on the full duplex CSI report. The operations of 1825 may be performed according to the methods described herein. In some examples, aspects of the operations of 1825 may be performed by a full duplex CSI estimator as described with reference to FIGS. 9 through 12.

At 1830, the base station may transmit an uplink grant and a downlink grant based on the radio resource allocation, the downlink transport format, and the uplink transport format. The operations of 1830 may be performed according to the methods described herein. In some examples, aspects of the operations of 1830 may be performed by a full duplex CSI estimator as described with reference to FIGS. 9 through 12.

Embodiment 1: A method for wireless communications by a user equipment (UE), comprising: receiving a channel state information (CSI) reporting configuration for full duplex CSI reporting; monitoring for a CSI reference signal based at least in part on the CSI reporting configuration; and transmitting a full duplex CSI report that comprises uplink bandwidth information based at least in part on the monitoring.

Embodiment 2: The method of embodiment 1, wherein transmitting the full duplex CSI report comprises: transmitting a full duplex CSI report that comprises the uplink bandwidth information that indicates channel state information for a plurality of different uplink bandwidths.

Embodiment 3: The method of any of embodiments 1 or 2, wherein receiving the CSI reporting configuration comprises: receiving the CSI reporting configuration that indicates an uplink bandwidth, wherein the uplink bandwidth information indicates CSI for the uplink bandwidth.

Embodiment 4: The method of any of embodiments 1 to 3, further comprising: receiving an uplink grant and a downlink grant based at least in part on the full duplex CSI report; and simultaneously transmitting an uplink data transmission based at least in part on the uplink grant and receiving a downlink data transmission based at least in part on the downlink grant.

Embodiment 5: The method of any of embodiments 1 to 4, herein receiving the CSI reporting configuration comprises: receiving the CSI reporting configuration that indicates an uplink transmission power when measuring a downlink channel status, wherein the full duplex CSI report indicates full duplex CSI determined based at least in part on the uplink transmission power.

Embodiment 6: The method of any of embodiments 1 to 4, wherein receiving the CSI reporting configuration comprises: receiving the CSI reporting configuration that indicates an uplink multi-antenna scheme when measuring a downlink channel status, wherein the full duplex CSI report indicates full duplex CSI determined based at least in part on the uplink multi-antenna scheme.

Embodiment 7: The method of any of embodiments 1 to 4, wherein receiving the CSI reporting configuration comprises: receiving the CSI reporting configuration that indicates a CSI reference signal repetition scheme, wherein the full duplex CSI report indicates full duplex CSI determined based at least in part on the CSI reference signal repetition scheme.

Embodiment 8: The method of any of embodiments 1 to 7, further comprising: calculating full duplex CSI based at least in part on the CSI reporting configuration and the monitoring, wherein the full duplex CSI report indicates the calculated full duplex CSI.

Embodiment 9: The method of any of embodiments 1 to 7, further comprising: measuring a downlink channel status based at least in part on a first number of transmit antennas and a second number of receive antennas of the UE; determining a self-interference metric using the first number of transmit antennas and the second number of receive antennas; and calculating full duplex CSI based at least in part on the downlink channel status and the self-interference metric, wherein the full duplex CSI report indicates the calculated full duplex CSI.

Embodiment 10: The method of any of embodiments 1 to 7, further comprising: measuring a downlink channel status for an uplink transmission at one or more resource elements on the CSI reference signal; and calculating full duplex CSI based at least in part on the downlink channel status and a transmission type of the uplink transmission, wherein the full duplex CSI report indicates the calculated full duplex CSI.

Embodiment 11: The method of any of embodiments 1 to 10, wherein receiving the CSI reporting configuration comprises: receiving the CSI reporting configuration that indicates the uplink transmission type utilizes a first uplink transmission power of a plurality of different uplink transmission powers, a first uplink multiple antenna scheme of a plurality of different multiple antenna schemes, or both.

Embodiment 12: The method of any of embodiments 1 to 11, wherein transmitting the full duplex CSI report comprises: transmitting the full duplex CSI report that indicates a plurality of CSIs, each CSI of the plurality of CSIs corresponding to a respective uplink bandwidth value from a list of bandwidth values.

Embodiment 13: The method of any of embodiments 1 to 12, wherein the list of bandwidth values is a list of numbers of physical resource blocks, subbands, or both.

Embodiment 14: The method of any of embodiments 1 to 13, wherein transmitting the full duplex CSI report comprises: transmitting the full duplex CSI report that indicates that a respective CSI of the plurality of CSIs corresponds to a respective uplink bandwidth value from a list of bandwidth values.

Embodiment 15: The method of any of embodiments 12 to 14, wherein the full duplex CSI report includes a number of CSIs that is fewer than a number of uplink bandwidth value in the list of bandwidth values.

Embodiment 16: The method of embodiment 15, further comprising: selecting a subset of uplink bandwidth values from the list of bandwidth values on which to report CSI based at least in part on a priority order.

Embodiment 17: The method of any of embodiments 1 to 16, wherein transmitting the full duplex CSI report comprises: transmitting the full duplex CSI report that indicates a single CSI and a single uplink bandwidth threshold.

Embodiment 18: The method of embodiment 17, wherein the single CSI is valid when uplink bandwidth does not exceed the uplink bandwidth threshold.

Embodiment 19: The method of any of embodiments 1 to 18, wherein transmitting the full duplex CSI report comprises: transmitting the full duplex CSI report that indicates the uplink bandwidth information that reports one or more of an uplink pathloss metric, an uplink power headroom metric, a self-interference cancellation ratio, or any combination thereof.

Embodiment 20: The method of any of embodiments 1 to 18, wherein transmitting the full duplex CSI report comprises: transmitting the full duplex CSI report that indicates the uplink bandwidth information that reports a self-interference cancellation ratio, a non-full duplex CSI, and one of an uplink pathloss metric or an uplink power headroom metric.

Embodiment 21: The method of any of embodiments 1 to 18, wherein transmitting the full duplex CSI report comprises: transmitting the full duplex CSI report that indicates the uplink bandwidth information that reports a power of self-interference metric, an uplink bandwidth threshold, and a non-full duplex CSI.

Embodiment 22: The method of embodiment 21, wherein the power of self-interference metric is as reported when uplink bandwidth does not exceed the uplink bandwidth threshold.

Embodiment 23: The method of any of embodiments 1 to 22, wherein receiving the CSI reporting configuration comprises: receiving the CSI reporting configuration that indicates a number of physical resource blocks or subbands as the uplink bandwidth.

Embodiment 24: The method of any of embodiments 1 to 23, wherein receiving the CSI reporting configuration comprises: receiving the CSI reporting configuration that indicates at least one uplink bandwidth value, wherein the full duplex CSI report reports a CSI value for each uplink bandwidth value of the at least one uplink bandwidth value.

Embodiment 25: The method of any of embodiments 1 to 24, wherein receiving the CSI reporting configuration comprises: receiving radio resource control signaling comprising the CSI reporting configuration, a medium access control (MAC) control element (CE) comprising the CSI reporting configuration, downlink control information (DCI) comprising the CSI reporting configuration, or any combination thereof.

Embodiment 26: The method of any of embodiments 1 to 25, wherein receiving the CSI reporting configuration comprises: receiving the CSI reporting configuration comprises a flag indicating whether to report CSI for a full duplex mode, a non-full duplex mode, or both; and generating the full duplex CSI report based at least in part on the flag.

Embodiment 27: The method of embodiment 26, further comprising: determining whether to report CSI for the full duplex mode based at least in part on a spectrum efficiency threshold.

Embodiment 28: The method of any of embodiments 1 to 27, further comprising: transmitting capability signaling that indicates support for a full duplex mode in which the UE is capable of simultaneously transmitting and receiving with a serving base station using a same time-frequency resource, wherein the CSI reporting configuration for full duplex CSI reporting is received based at least in part on the capability signaling.

Embodiment 29: An apparatus comprising at least one means for performing a method of any of embodiments 1 to 28.

Embodiment 30: An apparatus for wireless communications comprising a processor; memory in electronic communication with the processor; and instructions stored in the memory and executable by the processor to cause the apparatus to perform a method of any of embodiments 1 to 28.

Embodiment 31: A non-transitory computer-readable medium storing code for wireless communications, the code comprising instructions executable by a processor to perform a method of any of embodiments 1 to 28.

Embodiment 32: A method for wireless communications by a base station, comprising: transmitting a channel state information (CSI) reporting configuration for full duplex CSI reporting; transmitting a CSI reference signal based at least in part on the CSI reporting configuration; and receiving a full duplex CSI report that comprises uplink bandwidth information based at least in part on the transmitting the CSI reference signal.

Embodiment 33: The method of embodiment 32, wherein receiving the full duplex CSI report comprises: receiving a full duplex CSI report that comprises the uplink bandwidth information that indicates channel state information for a plurality of different uplink bandwidths.

Embodiment 34: The method of any of embodiments 32 or 33, wherein transmitting the CSI reporting configuration comprises: transmitting the CSI reporting configuration that indicates an uplink bandwidth, wherein the uplink bandwidth information indicates CSI for the uplink bandwidth.

Embodiment 35: The method of any of embodiments 32 to 34, further comprising: transmitting an uplink grant and a downlink grant based at least in part on the full duplex CSI report; and simultaneously receiving an uplink data transmission based at least in part on the uplink grant and transmitting a downlink data transmission based at least in part on the downlink grant.

Embodiment 36: The method of any of embodiments 32 to 35, wherein transmitting the CSI reporting configuration comprises: transmitting the CSI reporting configuration that indicates an uplink transmission power when measuring a downlink channel status, wherein the full duplex CSI report indicates full duplex CSI determined based at least in part on the uplink transmission power.

Embodiment 37: The method of any of embodiments 32 to 35, wherein transmitting the CSI reporting configuration comprises: transmitting the CSI reporting configuration that indicates an uplink multi-antenna scheme when measuring a downlink channel status, wherein the full duplex CSI report indicates full duplex CSI determined based at least in part on the uplink multi-antenna scheme.

Embodiment 38: The method of any of embodiments 32 to 35, wherein transmitting the CSI reporting configuration comprises: transmitting the CSI reporting configuration that indicates a CSI reference signal repetition scheme, wherein the full duplex CSI report indicates full duplex CSI determined based at least in part on the CSI reference signal repetition scheme.

Embodiment 39: The method of any of embodiments 32 to 35, wherein transmitting the CSI reporting configuration comprises: transmitting the CSI reporting configuration that indicates an uplink transmission type utilizes a first uplink transmission power of a plurality of different uplink transmission powers, a first uplink multiple antenna scheme of a plurality of different multiple antenna schemes, or both.

Embodiment 40: The method of any of embodiments 32 to 39, wherein receiving the full duplex CSI report comprises: receiving the full duplex CSI report that indicates a plurality of CSIs, each CSI of the plurality of CSIs corresponding to a respective uplink bandwidth value from a list of bandwidth values.

Embodiment 41: The method of embodiment 40, wherein the list of bandwidth values is a list of numbers of physical resource blocks, subbands, or both.

Embodiment 42: The method of any of embodiments 40 to 41, wherein receiving the full duplex CSI report comprises: receiving the full duplex CSI report that indicates that a respective CSI of the plurality of CSIs corresponds to a respective uplink bandwidth value from a list of bandwidth values.

Embodiment 43: The method of embodiment 42, wherein the full duplex CSI report includes a number of CSIs that is fewer than a number of uplink bandwidth value in the list of bandwidth values.

Embodiment 44: The method of any of embodiments 37 to 43, determining that the full duplex CSI report includes CSI for a subset of uplink bandwidth values from the list of bandwidth values based at least in part on a priority order.

Embodiment 45: The method of any of embodiments 32 to 44, wherein receiving the full duplex CSI report comprises: receiving the full duplex CSI report that indicates a single CSI and a single uplink bandwidth threshold.

Embodiment 46: The method of embodiment 45, wherein the single CSI is valid when uplink bandwidth does not exceed the uplink bandwidth threshold.

Embodiment 47: The method of any of embodiments 32 to 46, wherein receiving the full duplex CSI report comprises: receiving the full duplex CSI report that indicates the uplink bandwidth information that reports one or more of an uplink pathloss metric, an uplink power headroom metric, a self-interference cancellation ratio, or any combination thereof.

Embodiment 48: The method of any of embodiments 32 to 46, wherein receiving the full duplex CSI report comprises: receiving the full duplex CSI report that indicates the uplink bandwidth information that reports a self-interference cancellation ratio, a non-full duplex CSI, and one of an uplink pathloss metric or an uplink power headroom metric.

Embodiment 49: The method of any of embodiments 32 to 46, wherein receiving the full duplex CSI report comprises: receiving the full duplex CSI report that indicates the uplink bandwidth information that reports a power of self-interference metric, an uplink bandwidth threshold, and a non-full duplex CSI.

Embodiment 50: The method of embodiment 49, wherein the power of self-interference metric is as reported when uplink bandwidth does not exceed the uplink bandwidth threshold.

Embodiment 51: The method of any of embodiments 32 to 50, wherein transmitting the CSI reporting configuration comprises: transmitting the CSI reporting configuration that indicates a number of physical resource blocks or subbands as the uplink bandwidth.

Embodiment 52: The method of any of embodiments 32 to 51, wherein transmitting the CSI reporting configuration comprises: transmitting the CSI reporting configuration that indicates at least one uplink bandwidth value, wherein the full duplex CSI report reports a CSI value for each uplink bandwidth value of the at least one uplink bandwidth value.

Embodiment 53: The method of any of embodiments 32 to 52, wherein transmitting the CSI reporting configuration comprises: transmitting radio resource control signaling comprising the CSI reporting configuration, a medium access control (MAC) control element (CE) comprising the CSI reporting configuration, downlink control information (DCI) comprising the CSI reporting configuration, or any combination thereof.

Embodiment 54: The method of any of embodiments 32 to 53, wherein transmitting the CSI reporting configuration comprises: transmitting the CSI reporting configuration comprises a flag indicating whether to report CSI for a full duplex mode, a non-full-duplex, or both; and generating the full duplex CSI report based at least in part on the flag.

Embodiment 55: The method of any of embodiments 32 to 54, further comprising: determining whether to report CSI for the full duplex mode based at least in part on a spectrum efficiency threshold.

Embodiment 56: The method of any of embodiments 32 to 55, further comprising: determining a radio resource allocation, a downlink transport format for downlink data transfer, and an uplink transport format for uplink data transfer based at least in part on the full duplex CSI report; and transmitting an uplink grant and a downlink grant based at least in part on the radio resource allocation, the downlink transport format, and the uplink transport format.

Embodiment 57: The method of embodiment 56, further comprising: estimating the full duplex CSI for the UE based at least in part on the CSI report, wherein the radio resource allocation, the downlink transport format for downlink data transfer, and the uplink transport format for uplink data transfer are determined based at least in part on the estimated full duplex CSI.

Embodiment 58: The method of embodiment 57, wherein estimating the full duplex CSI for the UE comprises: estimating the full duplex CSI for the UE based at least in part on a pathloss metric, an uplink transmission power headroom metric, a self-interference cancellation ratio, a non-full duplex CSI, or any combination thereof, indicated in the full duplex CSI report, wherein the radio resource allocation, the downlink transport format for downlink data transfer, and the uplink transport format for uplink data transfer are determined based at least in part on the estimated full duplex CSI.

Embodiment 59: The method of embodiment 57, wherein estimating the full duplex CSI for the UE comprises: estimating the full duplex CSI for the UE based at least in part on a self-interference metric, an uplink bandwidth threshold, and a non-full duplex CSI indicated in the full duplex CSI report, wherein the radio resource allocation, the downlink transport format for downlink data transfer, and the uplink transport format for uplink data transfer are determined based at least in part on the estimated full duplex CSI.

Embodiment 60: The method of any of embodiments 32 to 59, further comprising: receiving, from a user equipment (UE), capability signaling that indicates support for a full duplex mode in which the UE is capable is simultaneously transmitting and receiving with a serving base station using a same time-frequency resource, wherein the CSI reporting configuration for full duplex CSI reporting is transmitted based at least in part on the capability signaling.

Embodiment 61: An apparatus comprising at least one means for performing a method of any of embodiments 32 to 60.

Embodiment 62: An apparatus for wireless communications comprising a processor; memory in electronic communication with the processor; and instructions stored in the memory and executable by the processor to cause the apparatus to perform a method of any of embodiments 32 to 60.

Embodiment 63: A non-transitory computer-readable medium storing code for wireless communications, the code comprising instructions executable by a processor to perform a method of any of embodiments 32 to 60.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a user equipment (UE), comprising:
   receiving a channel state information (CSI) reporting configuration for full duplex CSI reporting;
   monitoring for a CSI reference signal based at least in part on the CSI reporting configuration;
   transmitting a full duplex CSI report that comprises uplink bandwidth information based at least in part on the monitoring;
   receiving an uplink grant and a downlink grant based at least in part on the full duplex CSI report; and
   simultaneously transmitting an uplink data transmission based at least in part on the uplink grant and receiving a downlink data transmission based at least in part on the downlink grant.

2. The method of claim 1, wherein transmitting the full duplex CSI report comprises:
   transmitting a full duplex CSI report that comprises the uplink bandwidth information that indicates channel state information for a plurality of different uplink bandwidths.

3. The method of claim 1, wherein receiving the CSI reporting configuration comprises:
   receiving the CSI reporting configuration that indicates an uplink bandwidth, wherein the uplink bandwidth information indicates CSI for the uplink bandwidth.

4. The method of claim 1, wherein receiving the CSI reporting configuration comprises:
   receiving the CSI reporting configuration that indicates an uplink transmission power when measuring a downlink channel status, wherein the full duplex CSI report indicates full duplex CSI determined based at least in part on the uplink transmission power.

5. The method of claim 1, wherein receiving the CSI reporting configuration comprises:
   receiving the CSI reporting configuration that indicates an uplink multi-antenna scheme when measuring a downlink channel status, wherein the full duplex CSI report indicates full duplex CSI determined based at least in part on the uplink multi-antenna scheme.

6. The method of claim 1, wherein receiving the CSI reporting configuration comprises:
   receiving the CSI reporting configuration that indicates a CSI reference signal repetition scheme, wherein the full duplex CSI report indicates full duplex CSI determined based at least in part on the CSI reference signal repetition scheme.

7. The method of claim 1, further comprising:
   calculating full duplex CSI based at least in part on the CSI reporting configuration and the monitoring, wherein the full duplex CSI report indicates the calculated full duplex CSI.

8. The method of claim 1, further comprising:
   measuring a downlink channel status based at least in part on a first number of transmit antennas and a second number of receive antennas of the UE;
   determining a self-interference metric using the first number of transmit antennas and the second number of receive antennas; and
   calculating full duplex CSI based at least in part on the downlink channel status and the self-interference metric, wherein the full duplex CSI report indicates the calculated full duplex CSI.

9. The method of claim 1, further comprising:
   measuring a downlink channel status for an uplink transmission at one or more resource elements on the CSI reference signal; and
   calculating full duplex CSI based at least in part on the downlink channel status and a transmission type of the uplink transmission, wherein the full duplex CSI report indicates the calculated full duplex CSI.

10. The method of claim 1, wherein transmitting the full duplex CSI report comprises:
    transmitting the full duplex CSI report that indicates a single CSI and a single uplink bandwidth threshold.

11. The method of claim 1, wherein transmitting the full duplex CSI report comprises:
    transmitting the full duplex CSI report that indicates the uplink bandwidth information that reports one or more of an uplink pathloss metric, an uplink power headroom metric, a self-interference cancellation ratio, or any combination thereof.

12. The method of claim 1, wherein receiving the CSI reporting configuration comprises:
    receiving the CSI reporting configuration that indicates at least one uplink bandwidth value, wherein the full duplex CSI report reports a CSI value for each uplink bandwidth value of the at least one uplink bandwidth value.

13. The method of claim 1, wherein receiving the CSI reporting configuration comprises:
    receiving radio resource control signaling comprising the CSI reporting configuration, a medium access control (MAC) control element (CE) comprising the CSI reporting configuration, downlink control information (DCI) comprising the CSI reporting configuration, or any combination thereof.

14. The method of claim 1, wherein receiving the CSI reporting configuration comprises:
    receiving the CSI reporting configuration comprises a flag indicating whether to report CSI for a full duplex mode, a non-full duplex mode, or both; and
    generating the full duplex CSI report based at least in part on the flag.

15. The method of claim 14, further comprising:
    determining whether to report CSI for the full duplex mode based at least in part on a spectrum efficiency threshold.

16. The method of claim 1, further comprising:
    transmitting capability signaling that indicates support for a full duplex mode in which the UE is capable of simultaneously transmitting and receiving with a serving base station using a same time-frequency resource, wherein the CSI reporting configuration for full duplex CSI reporting is received based at least in part on the capability signaling.

17. A method for wireless communications by a base station, comprising:
    transmitting a channel state information (CSI) reporting configuration for full duplex CSI reporting;
    transmitting a CSI reference signal based at least in part on the CSI reporting configuration;
    receiving a full duplex CSI report that comprises uplink bandwidth information based at least in part on the transmitting the CSI reference signal;
    determining a radio resource allocation, a downlink transport format for downlink data transfer, and an uplink transport format for uplink data transfer based at least in part on the full duplex CSI report; and
    transmitting an uplink grant and a downlink grant based at least in part on the radio resource allocation, the downlink transport format, and the uplink transport format.

18. The method of claim 17, wherein receiving the full duplex CSI report comprises:
    receiving a full duplex CSI report that comprises the uplink bandwidth information that indicates channel state information for a plurality of different uplink bandwidths.

19. The method of claim 17, wherein transmitting the CSI reporting configuration comprises:
    transmitting the CSI reporting configuration that indicates an uplink bandwidth, wherein the uplink bandwidth information indicates CSI for the uplink bandwidth.

20. The method of claim 17, wherein transmitting the CSI reporting configuration comprises:
    transmitting the CSI reporting configuration that indicates an uplink transmission power when measuring a downlink channel status, wherein the full duplex CSI report indicates full duplex CSI determined based at least in part on the uplink transmission power.

21. The method of claim 17, wherein receiving the full duplex CSI report comprises:
receiving the full duplex CSI report that indicates a plurality of CSIs, each CSI of the plurality of CSIs corresponding to a respective uplink bandwidth value from a list of bandwidth values.

22. The method of claim 17, further comprising:
estimating the full duplex CSI for a user equipment based at least in part on the CSI report, wherein the radio resource allocation, the downlink transport format for downlink data transfer, and the uplink transport format for uplink data transfer are determined based at least in part on the estimated full duplex CSI.

23. The method of claim 22, wherein estimating the full duplex CSI for a user equipment (UE) comprises:
estimating the full duplex CSI for the user equipment based at least in part on a pathloss metric, an uplink transmission power headroom metric, a self-interference cancellation ratio, a non-full duplex CSI, or any combination thereof, indicated in the full duplex CSI report, wherein the radio resource allocation, the downlink transport format for downlink data transfer, and the uplink transport format for uplink data transfer are determined based at least in part on the estimated full duplex CSI.

24. The method of claim 22, wherein estimating the full duplex CSI for a user equipment (UE) comprises:
estimating the full duplex CSI for the user equipment based at least in part on a self-interference metric, an uplink bandwidth threshold, and a non-full duplex CSI indicated in the full duplex CSI report, wherein the radio resource allocation, the downlink transport format for downlink data transfer, and the uplink transport format for uplink data transfer are determined based at least in part on the estimated full duplex CSI.

25. An apparatus for wireless communications by a user equipment (UE), comprising:
one or more processors,
memory coupled with the one or more processors; and
instructions stored in the memory and executable by the one or more processors to cause the apparatus to:
receive a channel state information (CSI) reporting configuration for full duplex CSI reporting;
monitor for a CSI reference signal based at least in part on the CSI reporting configuration;
transmit a full duplex CSI report that comprises uplink bandwidth information based at least in part on the monitoring;
receive an uplink grant and a downlink grant based at least in part on the full duplex CSI report; and
simultaneously transmit an uplink data transmission based at least in part on the uplink grant and receive a downlink data transmission based at least in part on the downlink grant.

26. The apparatus of claim 25, wherein the instructions to transmit the full duplex CSI report are executable by the one or more processors to cause the apparatus to:
transmit a full duplex CSI report that comprises the uplink bandwidth information that indicates channel state information for a plurality of different uplink bandwidths.

27. The apparatus of claim 25, wherein the instructions to receive the CSI reporting configuration are executable by the one or more processors to cause the apparatus to:
receive the CSI reporting configuration that indicates an uplink bandwidth, wherein the uplink bandwidth information indicates CSI for the uplink bandwidth.

28. The apparatus of claim 25, wherein the instructions to receive the CSI reporting configuration are executable by the one or more processors to cause the apparatus to:
receive the CSI reporting configuration that indicates an uplink transmission power when measuring a downlink channel status, wherein the full duplex CSI report indicates full duplex CSI determined based at least in part on the uplink transmission power.

29. The apparatus of claim 25, wherein the instructions to receive the CSI reporting configuration are executable by the one or more processors to cause the apparatus to:
receive the CSI reporting configuration that indicates an uplink multi-antenna scheme when measuring a downlink channel status, wherein the full duplex CSI report indicates full duplex CSI determined based at least in part on the uplink multi-antenna scheme.

30. The apparatus of claim 25, wherein the instructions to receive the CSI reporting configuration are executable by the one or more processors to cause the apparatus to:
receive the CSI reporting configuration that indicates a CSI reference signal repetition scheme, wherein the full duplex CSI report indicates full duplex CSI determined based at least in part on the CSI reference signal repetition scheme.

31. An apparatus for wireless communications by a base station, comprising:
one or more processors,
memory coupled with the one or more processors; and
instructions stored in the memory and executable by the one or more processors to cause the apparatus to:
transmit a channel state information (CSI) reporting configuration for full duplex CSI reporting;
transmit a CSI reference signal based at least in part on the CSI reporting configuration;
receive a full duplex CSI report that comprises uplink bandwidth information based at least in part on the transmitting the CSI reference signal;
determine a radio resource allocation, a downlink transport format for downlink data transfer, and an uplink transport format for uplink data transfer based at least in part on the full duplex CSI report; and
transmit an uplink grant and a downlink grant based at least in part on the radio resource allocation, the downlink transport format, and the uplink transport format.

32. An apparatus for wireless communications by a user equipment (UE), comprising:
means for receiving a channel state information (CSI) reporting configuration for full duplex CSI reporting;
means for monitoring for a CSI reference signal based at least in part on the CSI reporting configuration;
means for transmitting a full duplex CSI report that comprises uplink bandwidth information based at least in part on the monitoring;
means for receiving an uplink grant and a downlink grant based at least in part on the full duplex CSI report; and
means for simultaneously transmitting an uplink data transmission based at least in part on the uplink grant and receiving a downlink data transmission based at least in part on the downlink grant.

* * * * *